US011292144B2

(12) United States Patent
Pedraza

(10) Patent No.: US 11,292,144 B2
(45) Date of Patent: Apr. 5, 2022

(54) HAMBURGER TEMPLET SLICER DEVICE AND METHOD FOR CUTTING A HAMBURGER

(71) Applicant: Victor Arnulfo Pedraza, Chicago, IL (US)

(72) Inventor: Victor Arnulfo Pedraza, Chicago, IL (US)

( * ) Notice: Subject to any disclaimer, the term of this patent is extended or adjusted under 35 U.S.C. 154(b) by 0 days.

(21) Appl. No.: 16/370,967

(22) Filed: Mar. 30, 2019

(65) Prior Publication Data
US 2019/0299478 A1 Oct. 3, 2019

Related U.S. Application Data

(60) Provisional application No. 62/650,486, filed on Mar. 30, 2018.

(51) Int. Cl.
*B26B 29/06* (2006.01)
*B26B 3/00* (2006.01)

(52) U.S. Cl.
CPC .............. *B26B 29/063* (2013.01); *B26B 3/00* (2013.01)

(58) Field of Classification Search
CPC ................................ B26B 29/063; B26B 3/00
See application file for complete search history.

(56) References Cited

U.S. PATENT DOCUMENTS

| | | | |
|---|---|---|---|
| 1,581,310 A | 4/1926 | Fetschan | |
| 1,871,713 A * | 8/1932 | Lowenthal | B26B 29/063 269/54.3 |
| 1,951,466 A * | 3/1934 | Alexander | B26B 29/063 269/53 |
| 2,089,980 A * | 8/1937 | Donham | A47J 17/00 83/762 |
| 2,277,888 A * | 3/1942 | Segal | B26B 29/063 33/525 |
| 2,652,087 A | 9/1953 | Turpin | |
| 2,925,110 A * | 2/1960 | Bayers | B26B 29/063 33/525 |
| 3,319,682 A * | 5/1967 | Hall | A47J 47/00 269/288 |

(Continued)

FOREIGN PATENT DOCUMENTS

| | | |
|---|---|---|
| JP | 200325282 A1 | 1/2003 |
| JP | 3211161 U | 6/2017 |
| KR | 20170052155 A1 | 5/2017 |

*Primary Examiner* — Omar Flores Sanchez
(74) *Attorney, Agent, or Firm* — David C. Beener

(57) ABSTRACT

A device for cutting a hamburger into a variety of equal size pieces that is both light-weight, portable and easy to clean for use at home or away. The device is an article of manufacture that can be made by existing manufacturing methods using commonly used raw materials, including recycled materials. The device includes extensions connected to a handle by a column and is designed to fit on top of a hamburger with each extension containing a slot to guide the cutting of the hamburger. Notches are included to guide the placement of toothpicks that are inserted into the hamburger before cutting and are used to hold the individual cut pieces together after removing the device. The device addresses the needs of those consumers that may have difficulty eating a full-size hamburger and would benefit from eating smaller pieces, such as the elderly and children.

16 Claims, 24 Drawing Sheets

(56) References Cited

U.S. PATENT DOCUMENTS

| | | | | |
|---|---|---|---|---|
| 4,056,026 | A | * | 11/1977 | Panaritis .............. A22C 17/006 |
| | | | | 83/454 |
| 4,341,376 | A | | 7/1982 | Germinario |
| 5,832,800 | A | | 11/1998 | Donoghue |
| 6,557,260 | B1 | | 5/2003 | Morris |
| 6,722,241 | B1 | * | 4/2004 | Anayas ................ A47J 47/005 |
| | | | | 83/449 |
| 8,241,688 | B2 | * | 8/2012 | Aguirre ................ A47J 47/005 |
| | | | | 426/518 |
| 9,701,030 | B1 | | 7/2017 | Foate |
| 10,251,506 | B1 | * | 4/2019 | Nolin ...................... A47J 29/02 |
| 2002/0194738 | A1 | * | 12/2002 | Francisco ............. B26B 29/063 |
| | | | | 30/291 |
| 2003/0101878 | A1 | * | 6/2003 | Muldoon ............. B26B 29/063 |
| | | | | 99/422 |
| 2004/0016131 | A1 | * | 1/2004 | Hayashi ................ B26B 29/063 |
| | | | | 30/302 |
| 2004/0144227 | A1 | * | 7/2004 | White ...................... B26B 29/06 |
| | | | | 83/523 |
| 2009/0282990 | A1 | | 11/2009 | Farnum |

\* cited by examiner

HAMBURGER TEMPLET SLICER DEVICE AND METHOD FOR CUTTING A HAMBURGER

CROSS-REFERENCE TO RELATED APPLICATIONS

This application claims the benefit of U.S. Provisional Patent Application No. 62/650,486 filed Mar. 30, 2018, which is incorporated by reference herein in its entirety, and which is not admitted to be prior art with respect to the present invention by its mention in the background or cross-reference section.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention was conceived by the Inventor after observing how some consumers struggle with eating a one-piece hamburger due to physical limitations, or age, such as children and the elderly. For those with limited dexterity, eating a full-size hamburger may be challenging to handle and result in losing part of the hamburgers contents, ruining the dining and eating experience.

Hamburgers are a very popular food item in our fast-paced society, probably best known from their associations with fast food establishments, but also available in the more traditional restaurant setting where food is ordered and served to the patrons at their table. Consumers are constantly exposed to the advertising for and hamburgers through multiple media outlets, including radio, television, magazines and billboards, just to name a few. Eating fast food has become the answer for many consumers who do not have the time, or the desire, to prepare a meal for themselves. Unfortunately, for some consumers the size of purchased hamburgers may not allow the consumer to eat and enjoy the meal as prepared for any number of reasons.

When ordering a hamburger from a fast food retailer, the consumer will typically receive the hamburger in a disposable wrapper or container, designed to hold the hamburger until it can be eaten; while ordering a hamburger in a restaurant setting the hamburger will generally be served on a plate and may be divided into several pieces rather an entire hamburger. The sit-down restaurant setting offers the consumer the option to request a hamburger be cut into different proportions to better facilitate eating, but this option is typically not available for fast-food style restaurants.

To address this need, the Inventor conceived of the present invention for the consumer that enjoys eating a hamburger, whether fast-food, in a restaurant, or at home, but would benefit from the hamburger being able to be cut into smaller, equal pieces or portions, for handling and eating. The present invention is designed to be light weight and portable and allow a consumer to make quickly make uniform cuts in a hamburger based on their preference, with easy cleanup after use.

BRIEF SUMMARY OF THE INVENTION

The present invention is directed to a device to allow consumers to easily hold a hamburger and cut it into a variety of pieces based upon their desire. The present invention generally comprises a round handle attached to a column, wherein a plurality of curved leg extensions with triangularly shaped supports are attached to the column, forming the device. The bottom surface of the leg extension includes a plurality of conically shaped projections used to securely hold the hamburger in place during cutting. Each leg extension and support structure include a cutting slot used for slicing the hamburger into equal size pieces. Between each pair of leg extensions, and in the leg extension support of some versions of the present invention, is incorporated a notch to guide the placement of a toothpick into the hamburger prior to cutting the hamburger, thus keeping the hamburger together as a single piece for eating once the device is used and removed from the hamburger.

BRIEF DESCRIPTION OF THE SEVERAL VIEWS OF THE DRAWINGS

These and other features and advantages of the present invention will become more evident, appreciated and better understood by reference to the detailed descriptions provided, and when considered in connection with the following drawings.

DETAILED DESCRIPTION OF THE INVENTION

Figure 1:
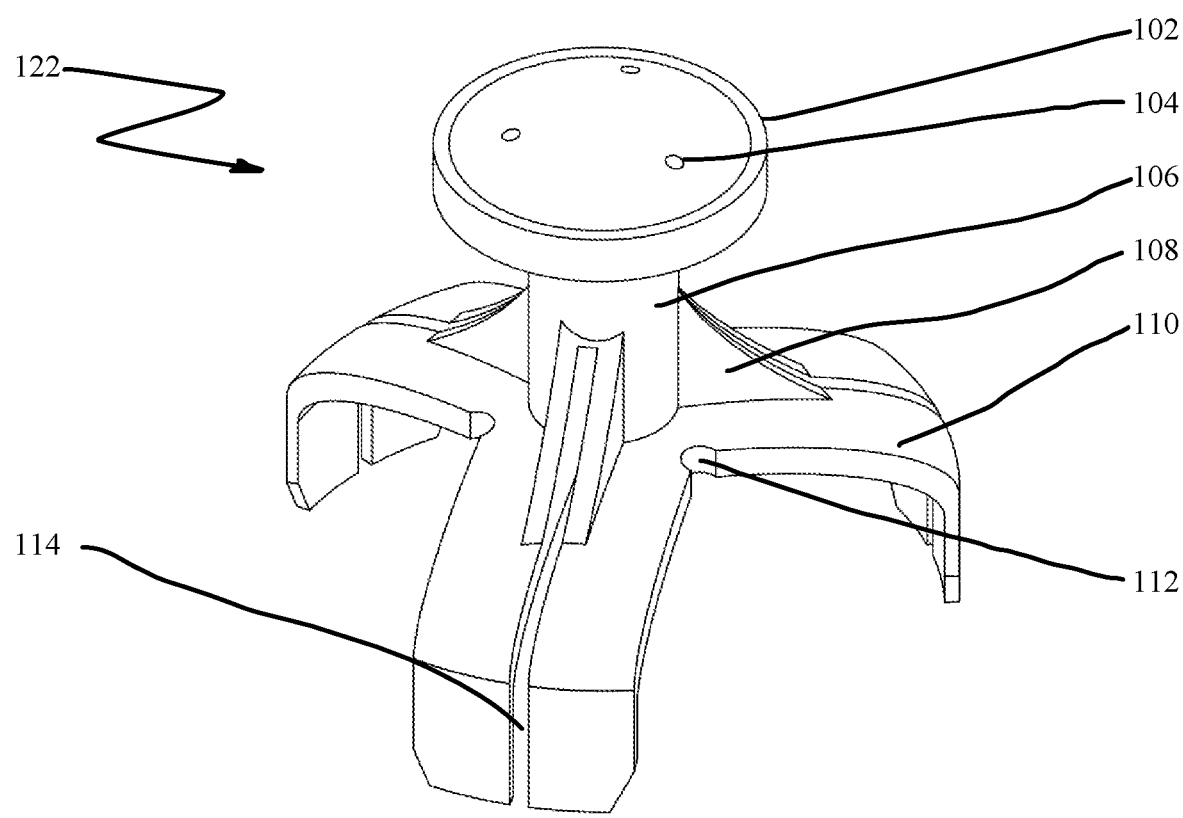
FIG. 1 shows a top perspective view of a version of the present invention for cutting a hamburger into three (3) equal pieces, showing the handle, column, notches, leg extensions and supports, and cutting slots.

To assist those consumers who may find a full-size hamburger challenging to handle while eating the Hamburger Templet Slicer was conceived. The Hamburger Templet Slicer allow a consumer to take a hamburger and cut it into a variety of smaller, equal size pieces according to their needs or preference. The Hamburger Templet Slicer has several versions to fit the needs of the consumer depending on the number of equally sliced pieces of hamburger they wish to have.

The terminology used in this specification is for the purpose of describing the embodiments only and not intended to be in any way limiting of the present invention so described. As used in this specification, the term "and/or" includes any and all combinations of one or more of the associated features and parts of the items listed, and the singular forms of "a," "am," and "the" are intended to include their plural forms as well as the singular forms, unless otherwise clearly indicated. It is further understood the terms "comprises" and/or "comprising" as used in this specification to specify the presence of stated features, steps, elements, operations and components, shall not preclude the presence or addition of one or more other features, steps, elements, operations and components, or groups thereof.

Unless otherwise defined, all terms used in this specification shall have the same meaning as commonly understood by one having ordinary skill in the art to which these inventions belong. It is further understood that terms commonly defined and used in dictionaries will be interpreted as having a meaning consistent with their meaning in the context of the relevant art and present disclosures and will not be interpreted in an idealized or overly formal sense unless expressly defined in this specification.

In describing the present invention, it is understood that numerous techniques and steps are disclosed. Each has an individual benefit and can be used in conjunction with one or more, or all, of the techniques and steps disclosed. Therefore, this specification will refrain from repeating every possible combination of individual steps in an unnecessary fashion where possible. The specification and claims are to be read with the understanding that such combinations are entirely within the scope of the present invention and claims disclosed.

For purposes of explanation in the following specification, numerous specific details are set forth to provide a thorough understanding of the present invention for those skilled in the art; however, it will be evident the present invention may be practiced without the specific details.

The present disclosure is to be considered representative of the invention, and not intended to limit the invention to the specific embodiments illustrated by the figures and/or descriptions that follow.

The detailed description set forth below, when read with the accompanying drawings, is intended to provide a description of the presently-preferred embodiments of the present invention and is not intended to present the only version in which the present invention may be constructed or utilized. The description identifies the function and steps necessary to construct and use the various versions of the present invention in connection with the embodiments presented in the drawings.

Referring to FIG. 1, this version of the present invention is directed to device 122 for quickly, easily, consistently and safely cutting a hamburger into three (3) equal pieces to enhance the eating experience for the consumer. Shown in this view are several of the features of the invention, including the handle 102 with toothpick storage holes 104, column 106 connecting the handle 102 to the leg extension(s) 110, and leg extension support(s) 108, with cutting slots 114, and notches 112, used to guide placement of toothpicks into the hamburger prior to cutting. The handle is preferably of circular shape to allow for easy one-handed control of the invention while cutting a hamburger; the column attaching the handle to the leg extension and supports is preferably cylindrical in nature; the leg extensions have a curved orientation to match the shape of a hamburger. The toothpick storage holes can be used to store the toothpicks when placing the invention on the hamburger for easy access for placing into the hamburger using the notches 112.

Figure 2:
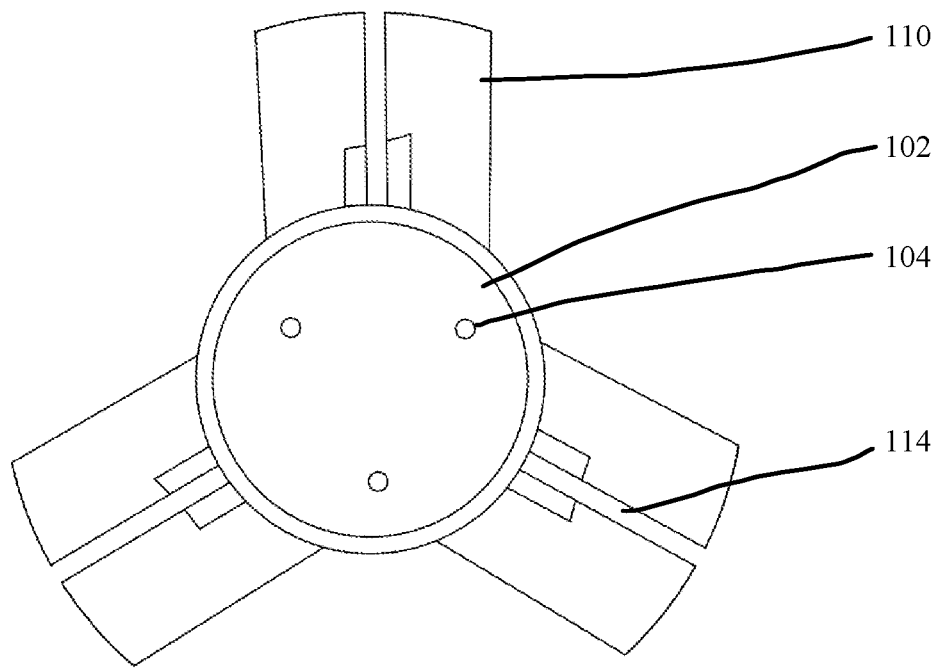
FIG. 2 shows a top view of this version of the present invention showing the handle with built-in toothpick storage holes, leg extensions and cutting slots.

Shown in FIG. 2 is a top view of the device 122, showing various features including the handle 102 with toothpick storage holes 104, and leg extension(s) 110 containing the cutting slots 114 used to guide cutting with a knife 124 (not shown).

Figure 3:
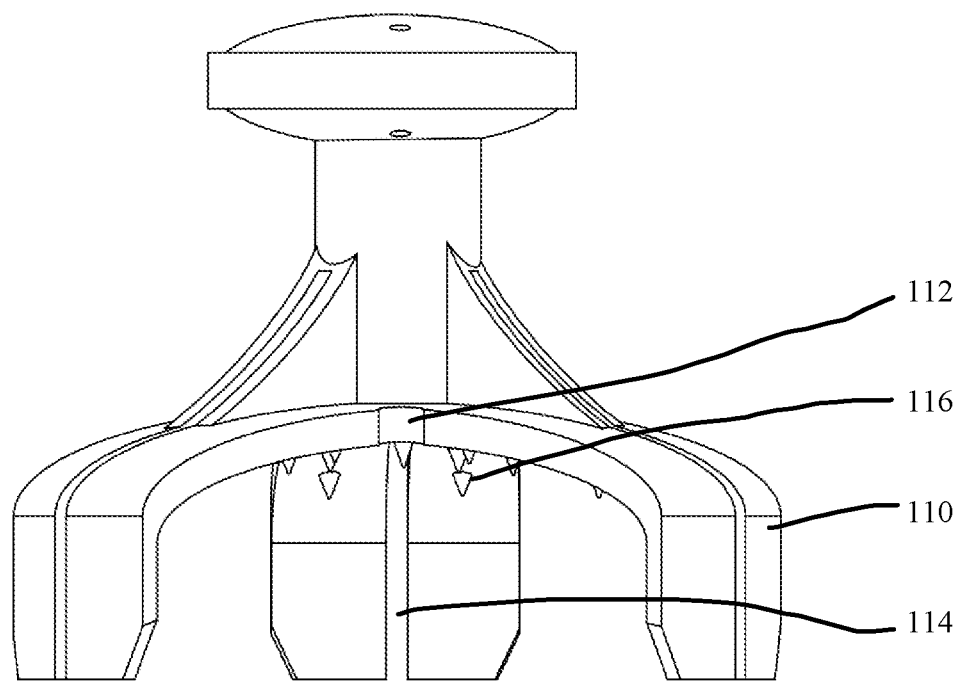
FIG. 3 shows a side view of this version of the present invention showing the notches, leg extensions, hamburger picks, and cutting slot.

As shown in FIG. 3, the device 122 is equipped with a plurality of hamburger picks 116, under the various leg extensions 110, comprising this version of the present invention. The hamburger picks 116 function to secure the hamburger in place during the cutting operation using the cutting slots 114. Also shown are the notches 112, used to guide the placement of toothpicks into the hamburger prior to cutting to maintain the cut pieces after device 122 is removed from the hamburger after cutting.

Figure 4:
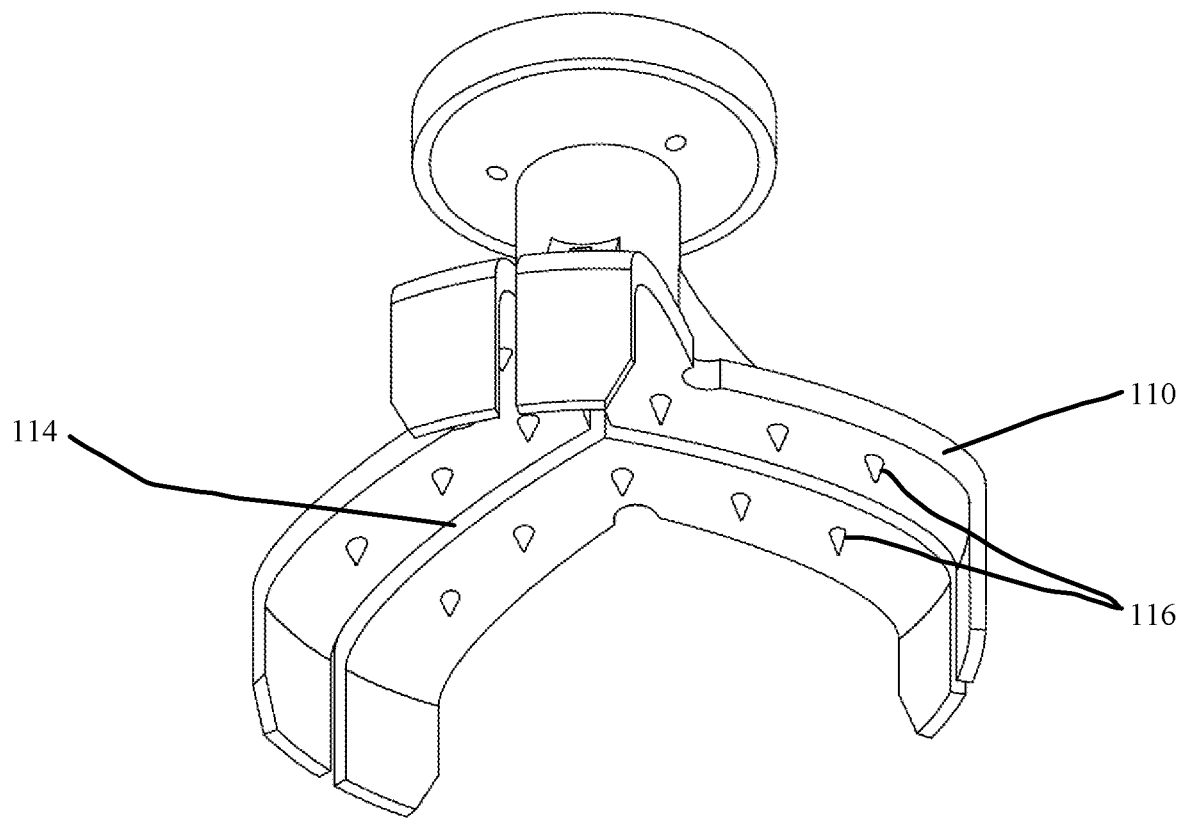
FIG. 4 shows a bottom perspective view of this version of the present invention showing the leg extensions, hamburger picks and cutting slots.

FIG. 4 offers a bottom perspective view of device 122 to show the hamburger picks 116 located on the bottom surface of the leg extensions 110 and the cutting slots 114 used to guide cutting with a knife 124 (not shown).

Figure 5:
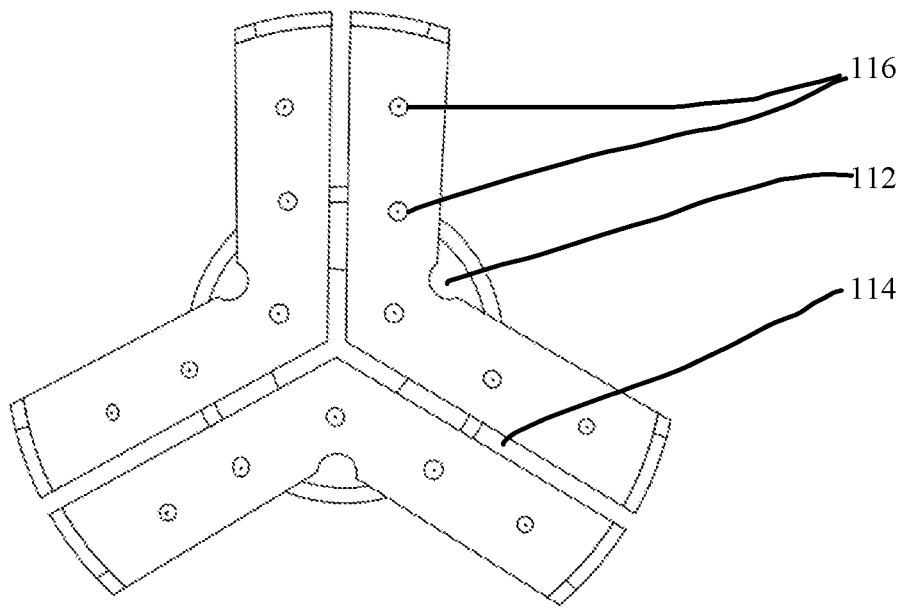
FIG. 5 shows a bottom view of this version of the present invention showing the notches, cutting slots and hamburger picks.

FIG. 5 provides a bottom view of the device 122 showing the notches 112, used to guide the placement of toothpicks into the hamburger prior to cutting, the cutting slots 114 used to guide cutting, and hamburger picks 116 under the various leg extensions.

Figure 6:
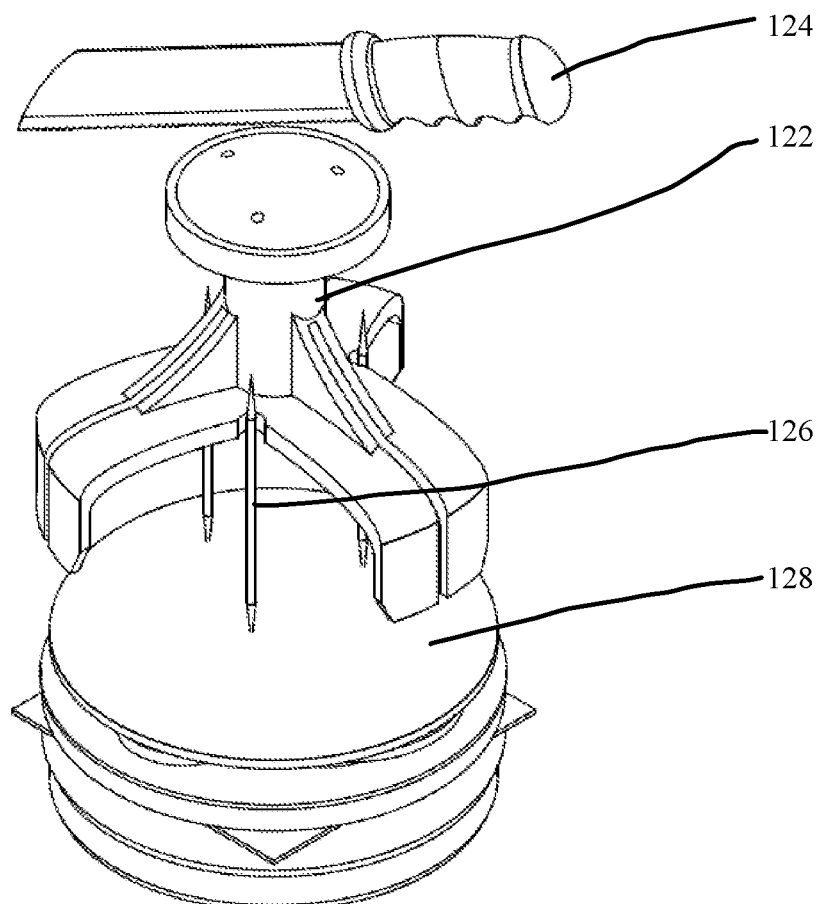
FIG. 6 shows an exploded view of this version of the present invention in preparation for cutting a hamburger into three (3) equal pieces.

As shown in FIG. 6, the device 122 is placed over a hamburger 128 and toothpicks 126 are inserted in the hamburger using the notches as a guide prior to cutting with a knife 124.

Figure 7:
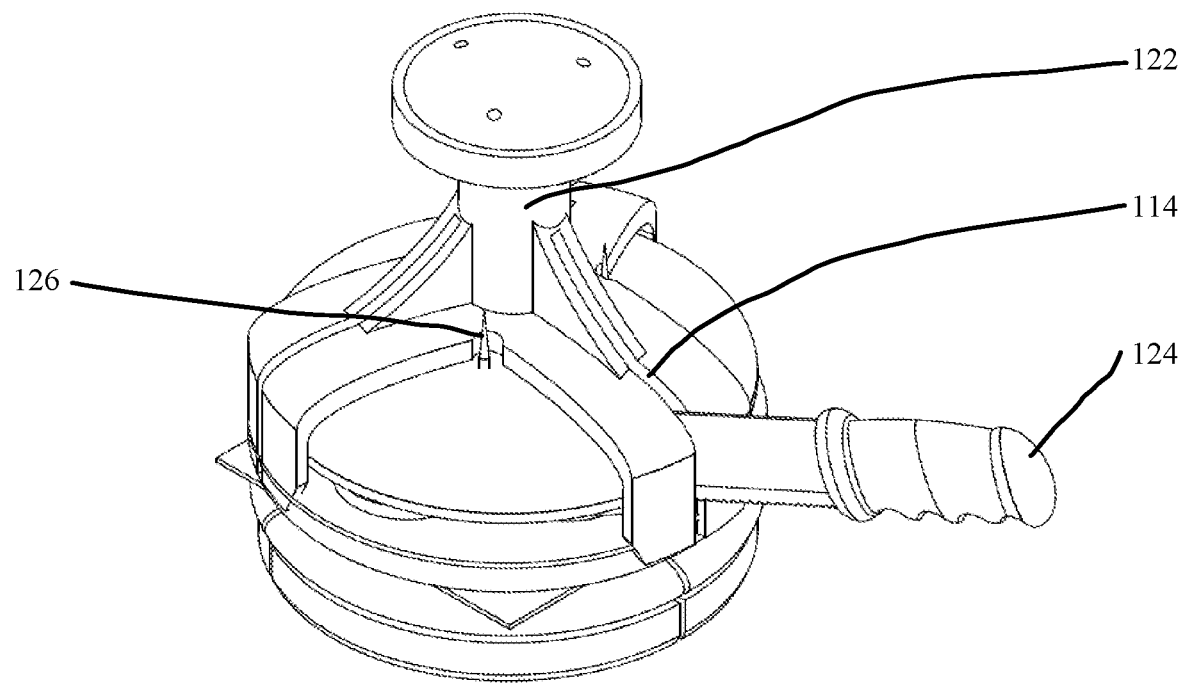
FIG. 7 shows a version of the present invention in place over a hamburger with toothpicks inserted using guide notches and a knife inserted into one of the cutting slots to cut it into three (3) equal.
Figure 8:
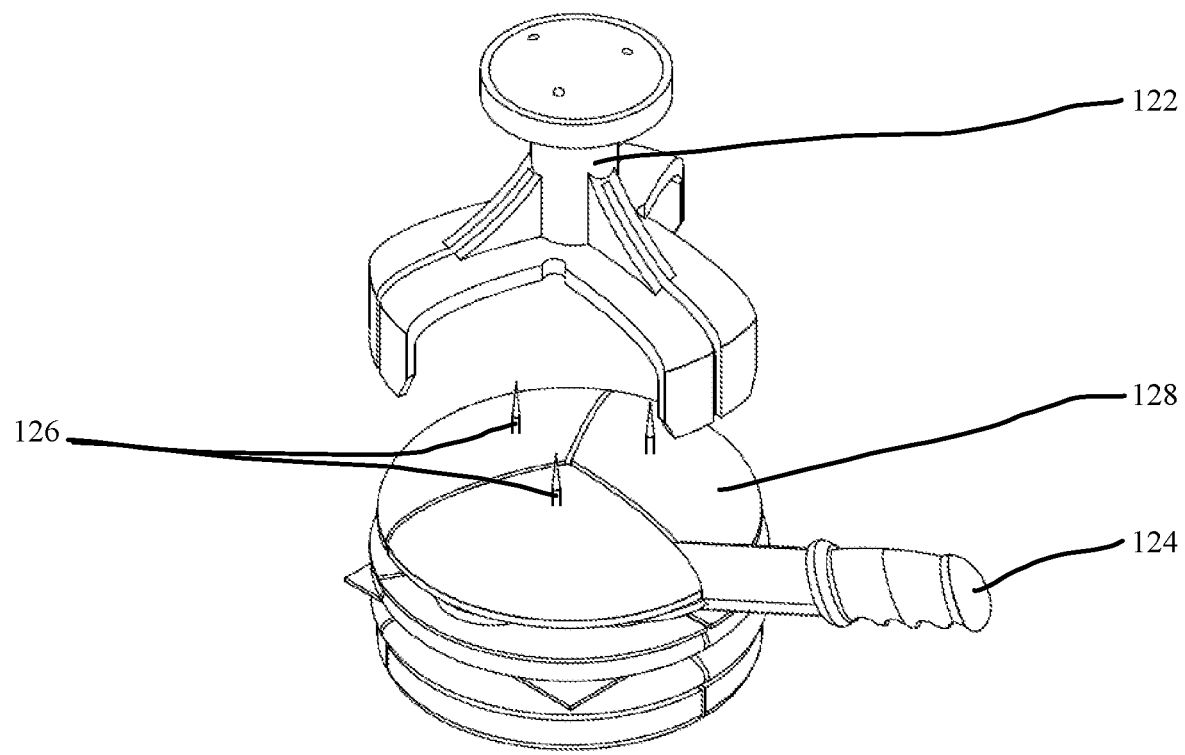
FIG. 8 shows this version of the present invention removed after the hamburger has been cut using a knife with the resulting individual pieces held together by the previously inserted toothpicks.
Figure 9:
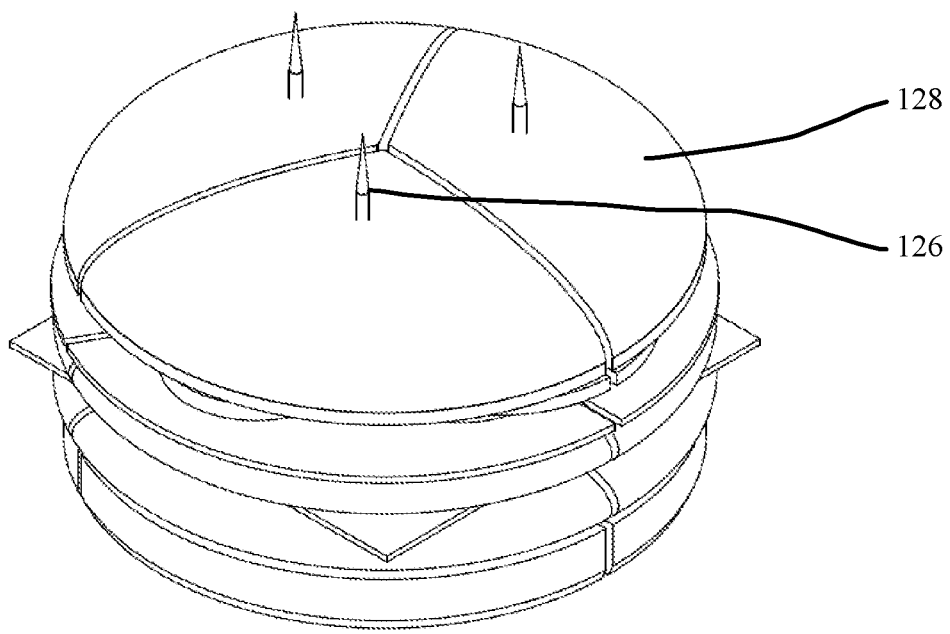
FIG. 9 shows the finished hamburger cut into three (3) equal pieces, each held in place by the previously inserted toothpicks.

FIG. 7 shows the device 122 placed on a hamburger with toothpicks 126 inserted and the hamburger being cut using the cutting slots 114 of the device to create three (3) equal pieces of cut hamburger in this version of the present invention, as further depicted in FIG. 8 and FIG. 9.

FIG. 8 depicts the device 122 being removed after cutting of the hamburger 128 into three (3) equal pieces, each piece held together by the previously inserted toothpicks 126 with the knife 124 shown in a cutting position.

FIG. 9 shows the hamburger 128 in three (3) equal pieces with toothpicks 126 in place to hold each cut piece together.

Figure 10:
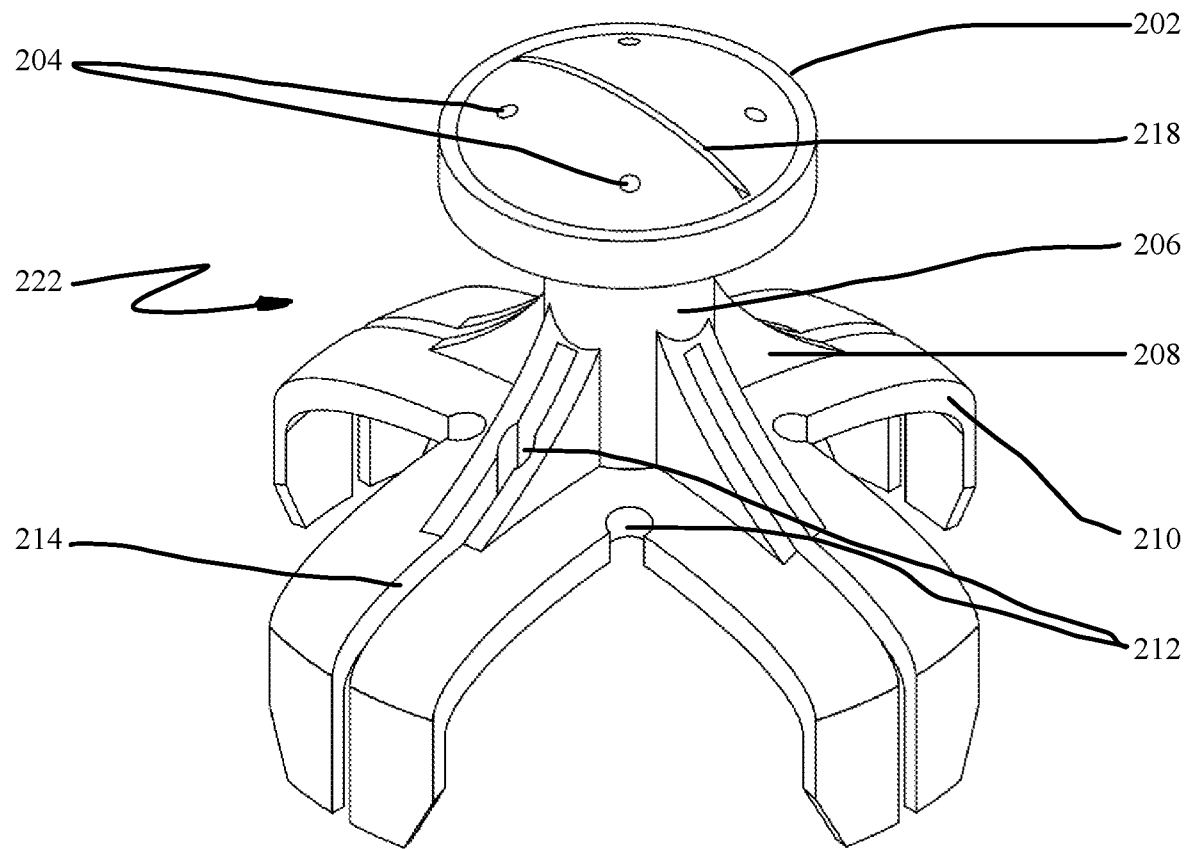
FIG. 10 shows a top perspective view of another version of the present invention for cutting a hamburger into either two (2) or four (4) equal pieces, showing the handle with built-in toothpick storage holes and cutting guide mark, column, notches, leg extensions and supports, and cutting slots.

FIG. 10 shows another version of the present invention as device 222 for quickly, easily, consistently and safely cutting a hamburger into either two (2) or four (4) equal pieces depending on the consumers preference. Shown are several of the features of this versions of the present invention, including the handle 202 with storage holes 204 for storing toothpicks and cutting guide mark 218, column 206 connecting the handle 202 to the leg extension(s) 210, and leg extension support(s) 208, with cutting slots 214, and notches 212, used to guide placement of toothpicks prior to cutting. The handle is preferably of circular shape to allow easy one-handed control of the device for cutting a hamburger; the column attaching the handle to the leg extension and supports is preferably cylindrical in nature; the leg extensions have a curved orientation to match the shape of a hamburger. In this version of the invention the handle 202 includes a cutting guide mark 218 to guide the consumer to use the cutting slots that align with the guide when selecting to cut a hamburger into two (2) equal pieces.

Figure 11:
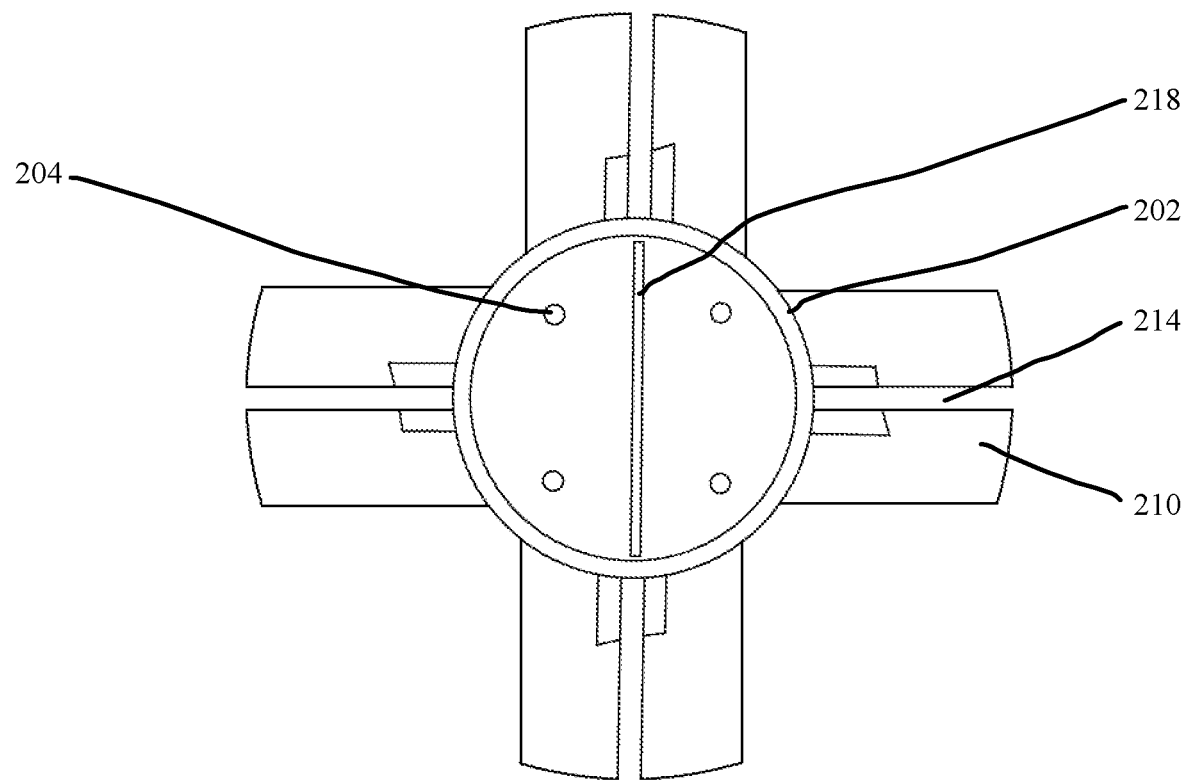
FIG. 11 shows a top view of this version of the present invention showing the handle with built-in toothpick storage holes and cutting guide, leg extensions and cutting slots.

FIG. 11 shows a top view of device 222 showing the handle 202, toothpick storage holes 204, cutting guide mark 218, leg extensions 201, and cutting slots 214.

Figure 12:
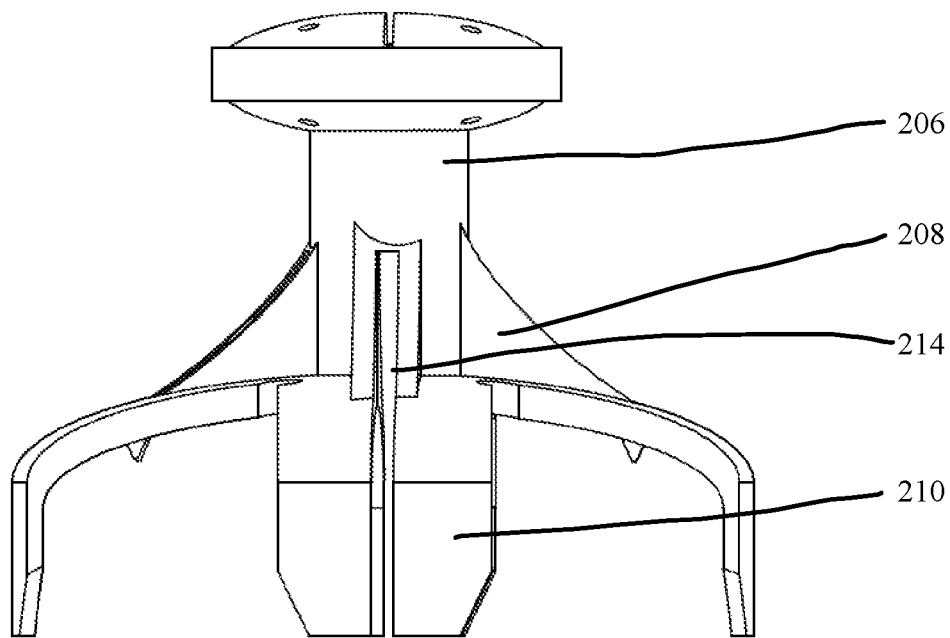
FIG. 12 shows a side view of this version of the present invention showing the column, leg extensions and supports, and cutting slots.

FIG. 12 is a side view of device 222 showing the column 206, leg extension supports 208, leg extensions 210, and cutting slots 214.

Figure 13:
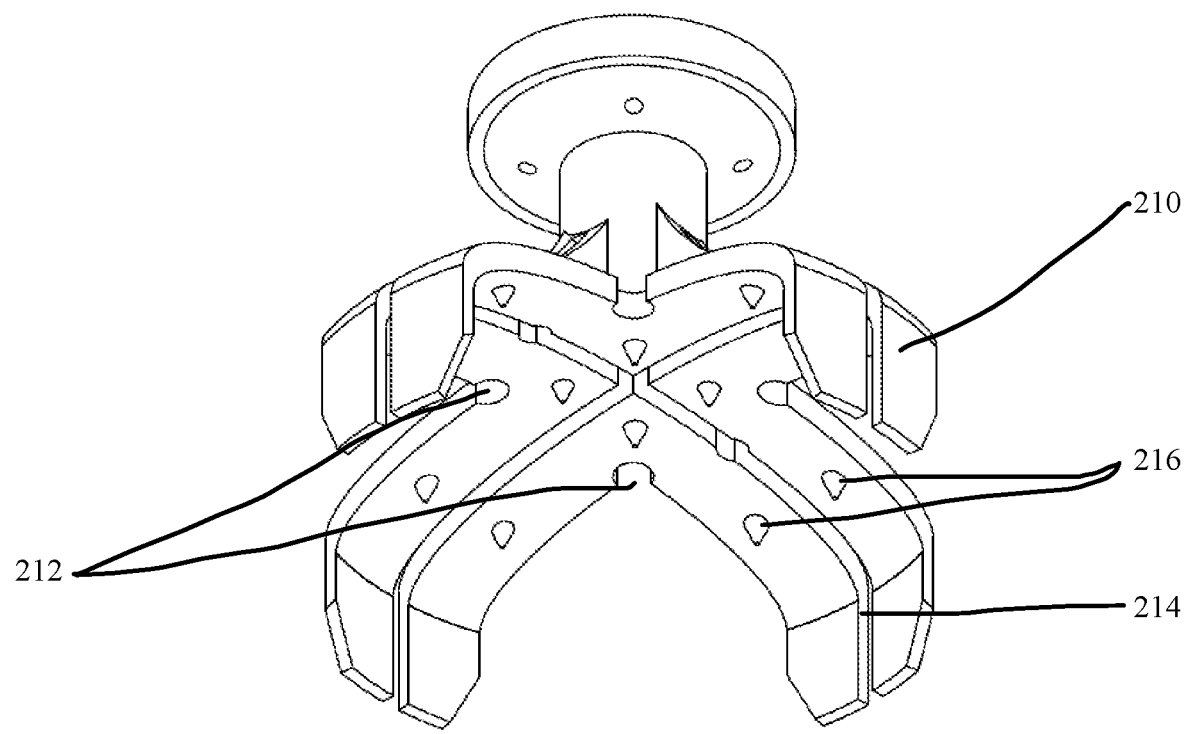
FIG. 13 shows a bottom perspective view of this version of the present invention showing the leg extensions and leg supports, cutting slots and hamburger picks.

As shown in FIG. 13, the device 222 is equipped with a plurality of hamburger picks 216, under the various leg extensions 210, comprising this version of the present invention. The hamburger picks 216 function to secure the hamburger in place during the cutting operation using the cutting slots 214. Also shown are the notches 212, used to guide the placement of toothpicks into the hamburger prior to cutting to keep the cut pieces together after device 222 is removed from the hamburger after cutting.

Figure 14:
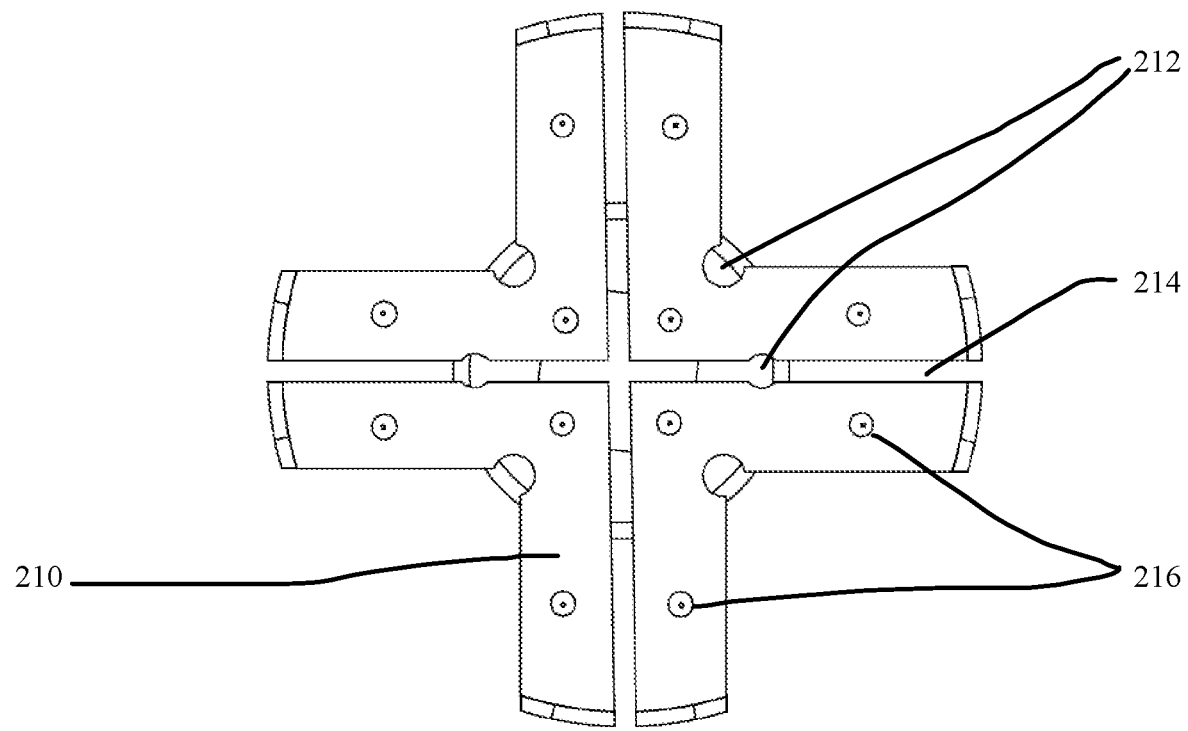
FIG. 14 shows a bottom view of a version of the present invention showing the leg extensions, notches, cutting slots and hamburger picks.

FIG. 14 shows the bottom of device 222 showing the location of the notches 212, cutting slots 214, hamburger picks 216, and leg extension 210.

Figure 15:
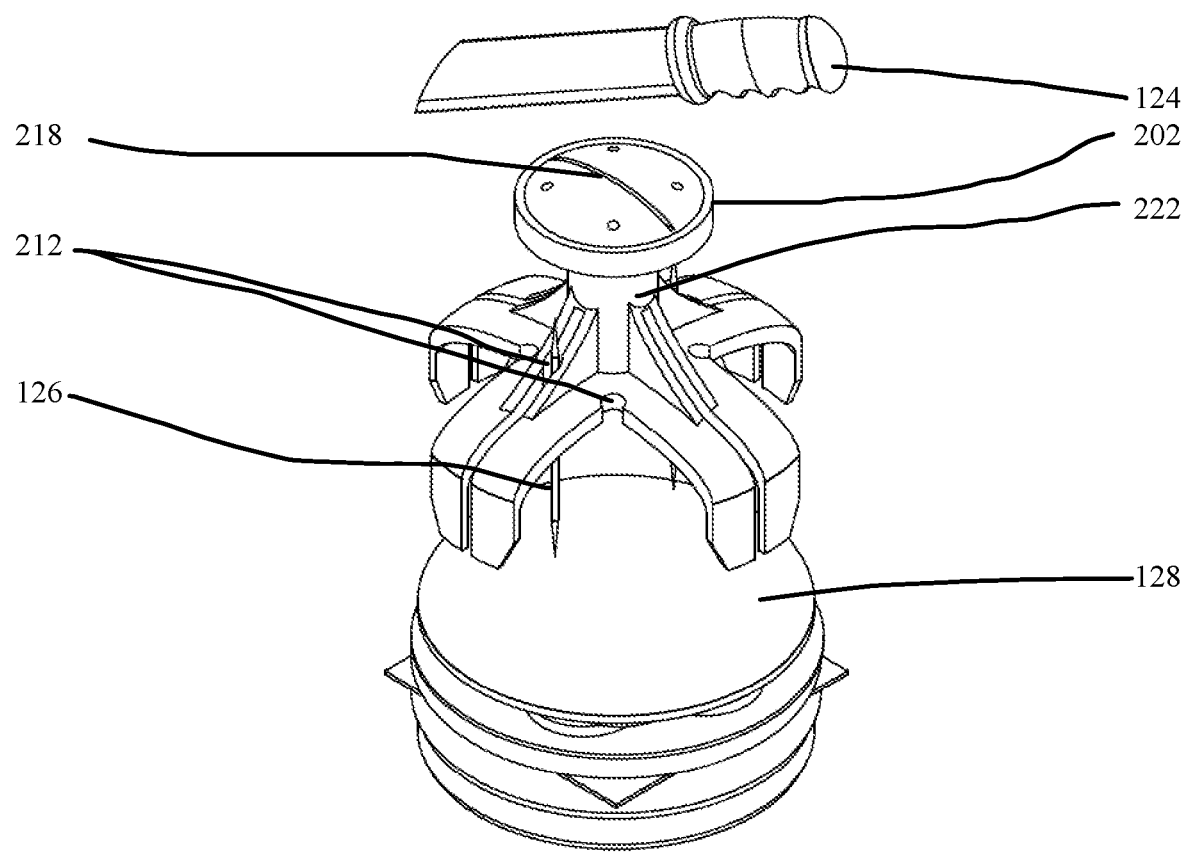
FIG. 15 shows an exploded view of this version of the present invention in preparation for cutting a hamburger into two (2) equal pieces, including the handle with cutting guide mark and notches.

FIG. 15 shows the device 222 configured to prepare to cut a hamburger into two (2) equal pieces by placing the device over a hamburger 128 and positioning toothpicks 126 into the hamburger using the notches on opposite sides of the cutting guide mark 218 on the handle 202.

Figure 16:
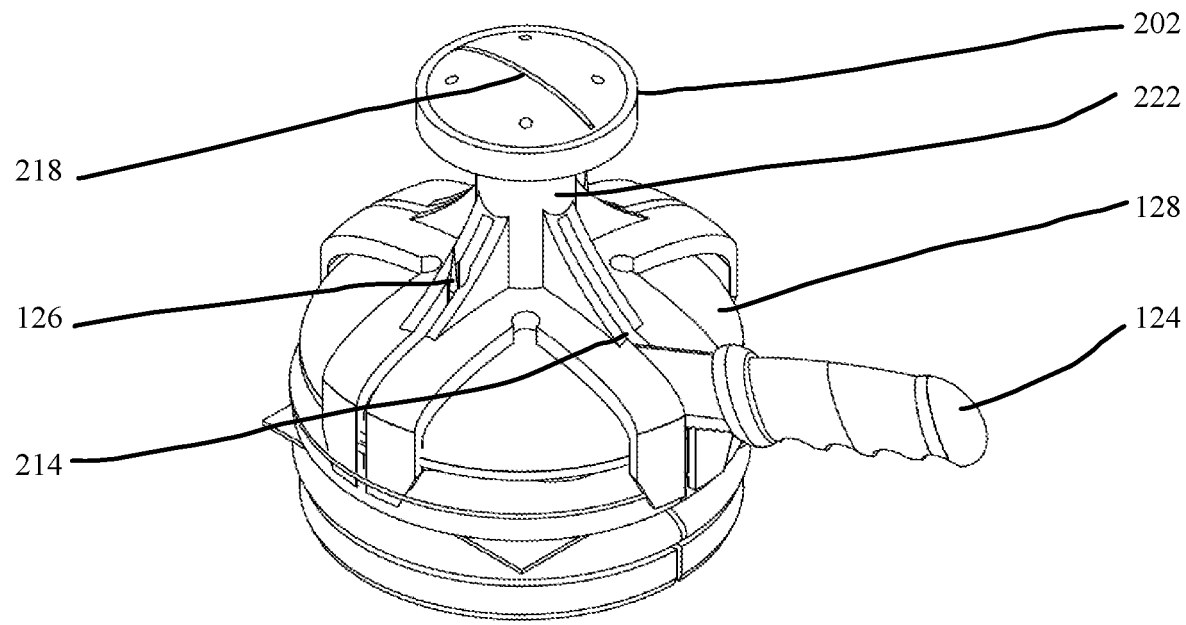
FIG. 16 shows a version of this present invention properly placed over a hamburger with toothpicks inserted using guide notches in then cutting slots and cut into two (2) equal pieces using the cutting slots lined up with the cutting guide mark in the handle.
Figure 17:
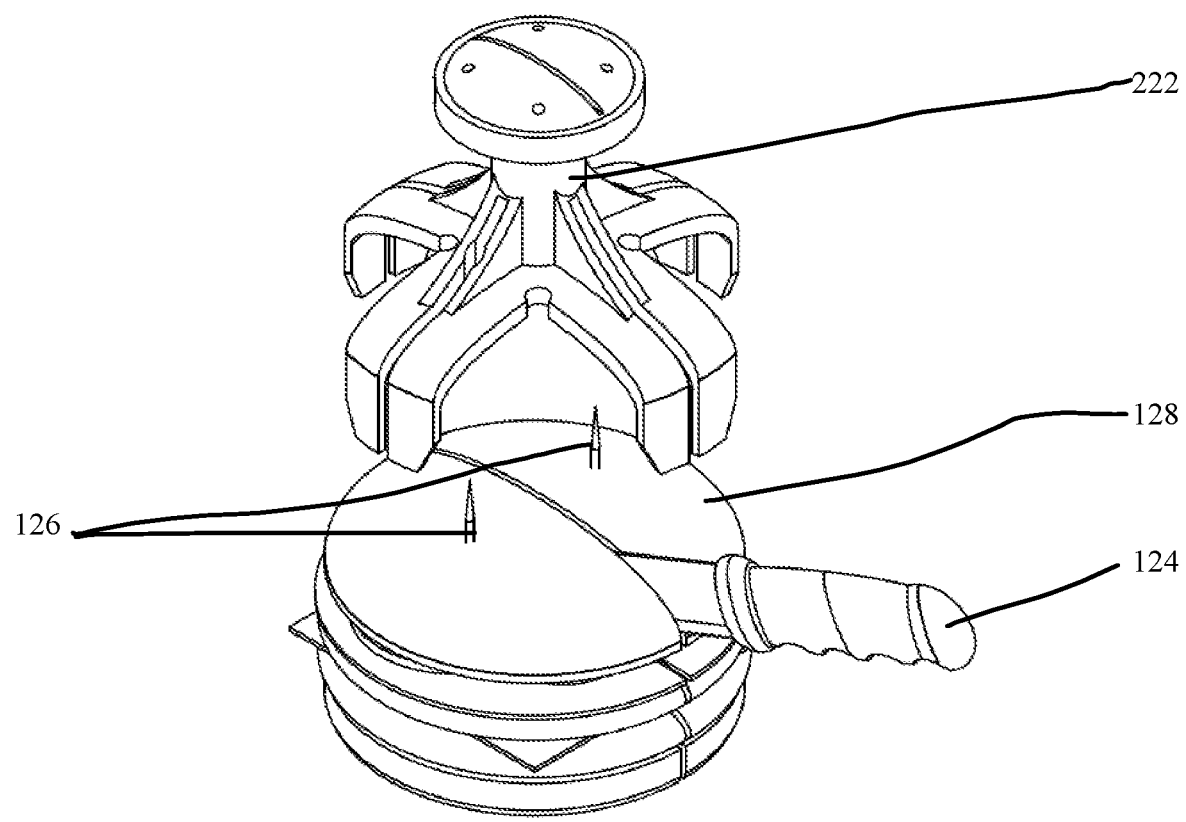
FIG. 17 shows the cut hamburger with this version of the present invention removed after the hamburger has been cut into two (2) equal pieces using a knife with the previously inserted toothpicks in the hamburger.
Figure 18:
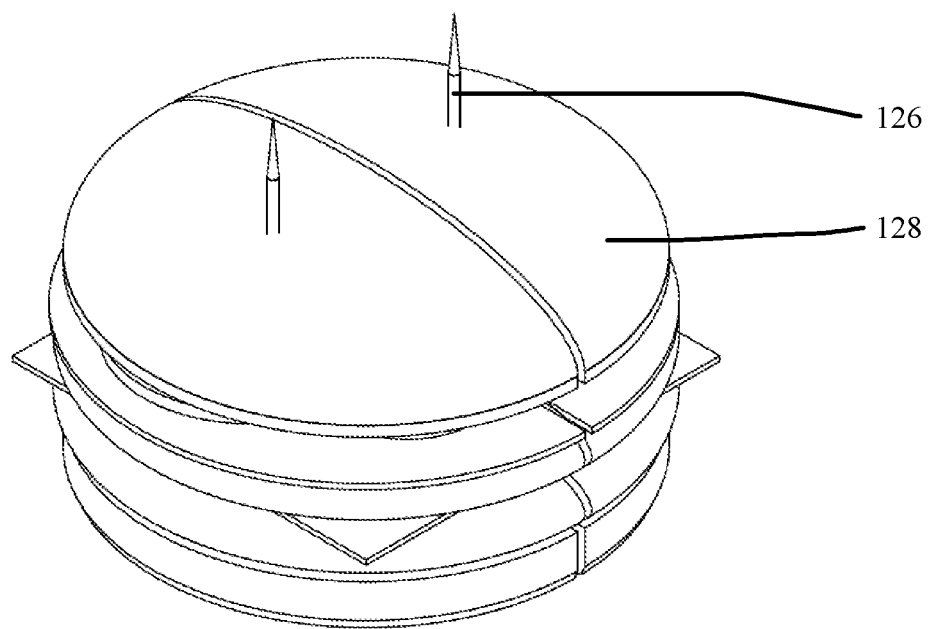
FIG. 18 shows the finished hamburger cut into two (2) equal pieces, each held in place by the previously inserted toothpicks.

FIG. 16 shows the device 222 placed on a hamburger with toothpicks 126 inserted into the hamburger as shown in FIG. 15 and the hamburger being cut using the cutting slot 214 aligned in the same direction as the cutting guide mark 218 on the handle 202, with knife 124 used to create two (2) equal pieces of hamburger in this version of the present invention, as further illustrated in FIG. 17 and FIG. 18.

FIG. 17 shows the device 222 being removed from the cut hamburger 128 with the previously inserted toothpicks 126 used to hold the individual cut pieces together with the knife 124 in the finished cut of the hamburger.

FIG. 18 shows the finished cut hamburger 128 with the previously inserted toothpicks 126 holding the cut pieces together as a single piece.

Figure 19:
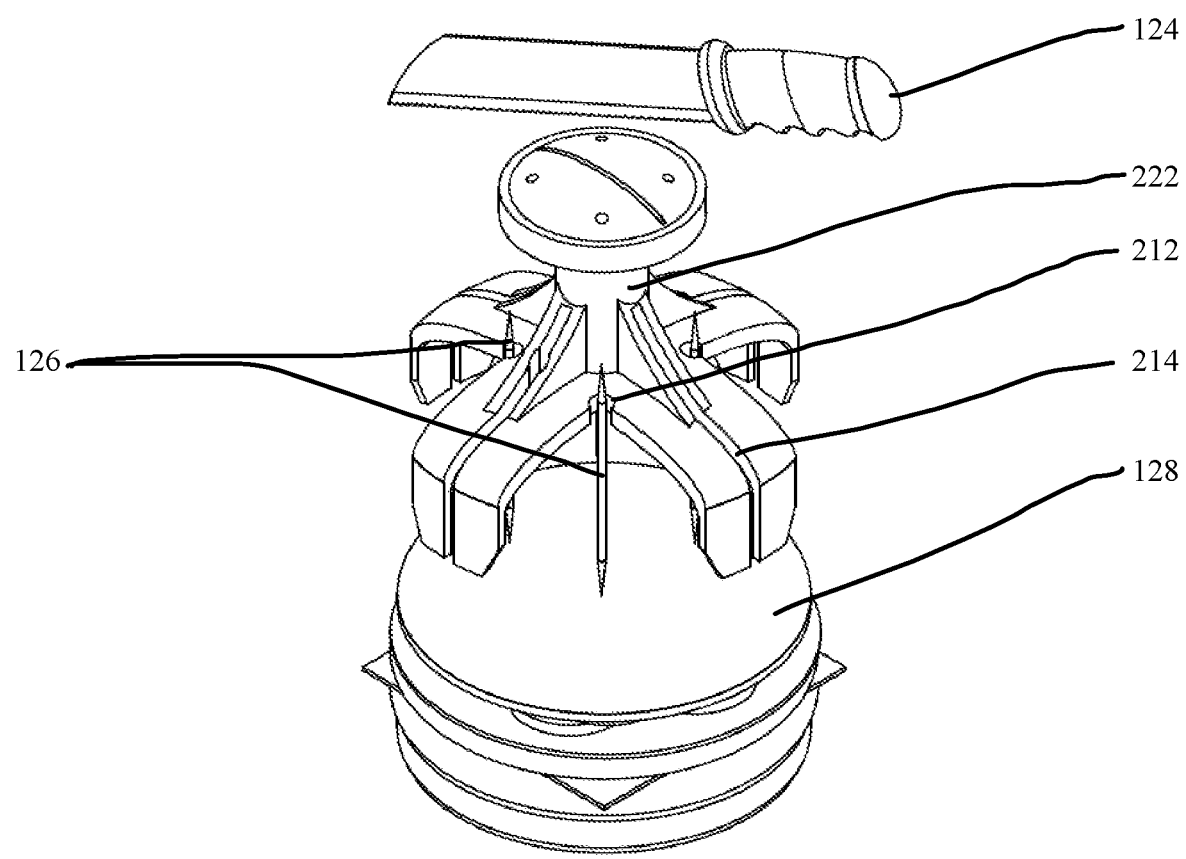
FIG. 19 shows an exploded view of this version of the present invention configured for cutting a hamburger into four (4) equal pieces, including the toothpicks, notches, cutting slots.

FIG. 19 shows the same device 222 configured to cut a hamburger into four (4) equal pieces by placing the device over a hamburger 128 and positioning toothpicks 126 into the hamburger using the four (4) notches 212.

Figure 20:
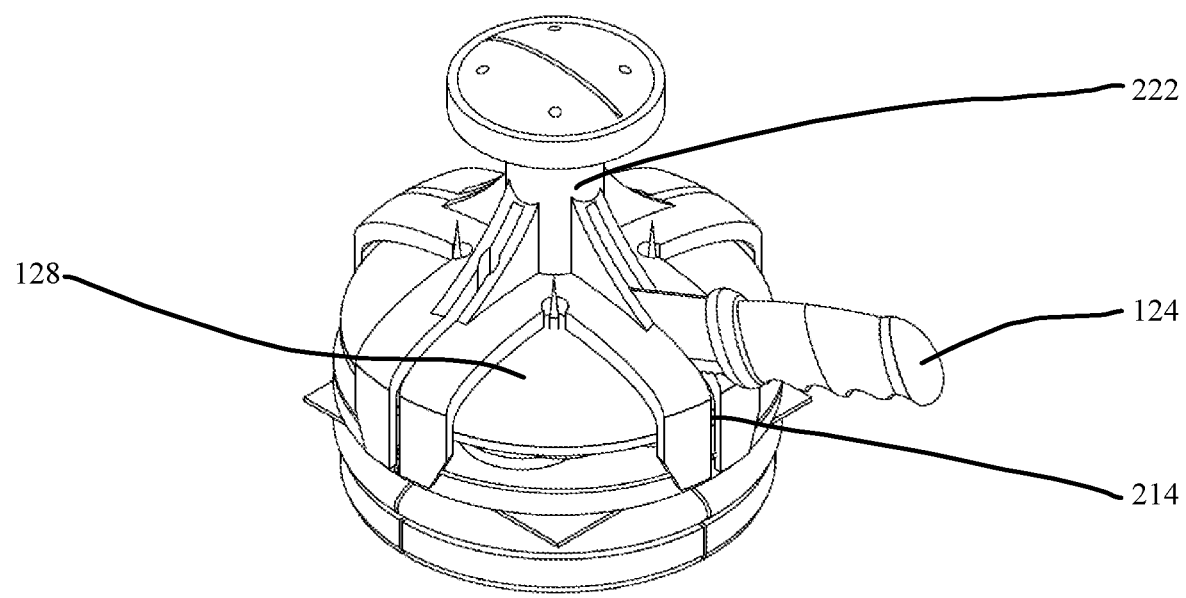
FIG. 20 shows this version of the present invention placed over a hamburger with toothpicks inserted using guide notches and being cut into four (4) equal pieces using the cutting slots.
Figure 21:
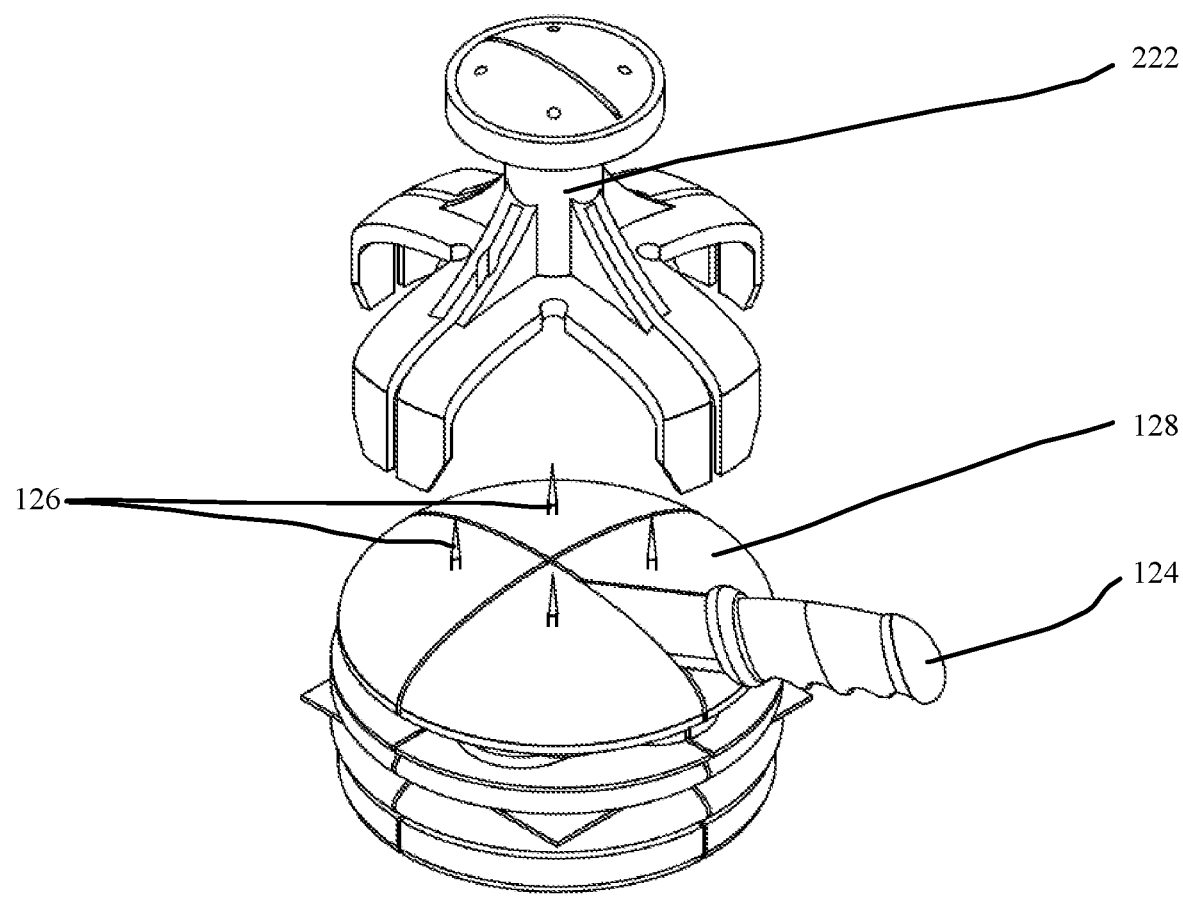
FIG. 21 shows the finished cut hamburger with this version of the present invention being removed, showing the finished hamburger cut into four (4) equal pieces.
Figure 22:
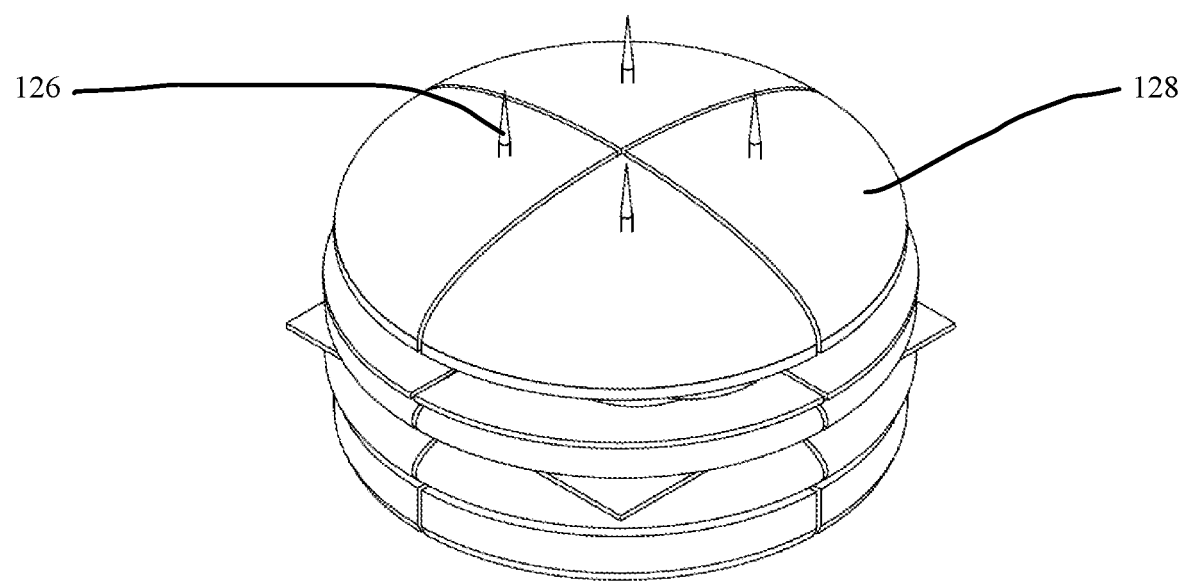
FIG. 22 shows the finished hamburger cut into four (4) equal pieces, each held in place by the previously inserted toothpicks.

FIG. 20 shows the device 222 placed on a hamburger with toothpicks 126 inserted into the hamburger as shown in FIG. 19 and the hamburger being cut using all available cutting slots 214 with a knife 124 to create four (4) equal pieces of hamburger in this version of the present invention, as further illustrated in FIG. 21 and FIG. 22.

FIG. 21 shows the device 222 being removed from the cut hamburger 128 with the previously inserted toothpicks 126 used to hold the cut pieces together with the knife 124 in a finished cut of the hamburger.

FIG. 22 shows the finished cut hamburger 128 with the previously inserted toothpicks 126 holding the individual cut pieces together.

Figure 23:
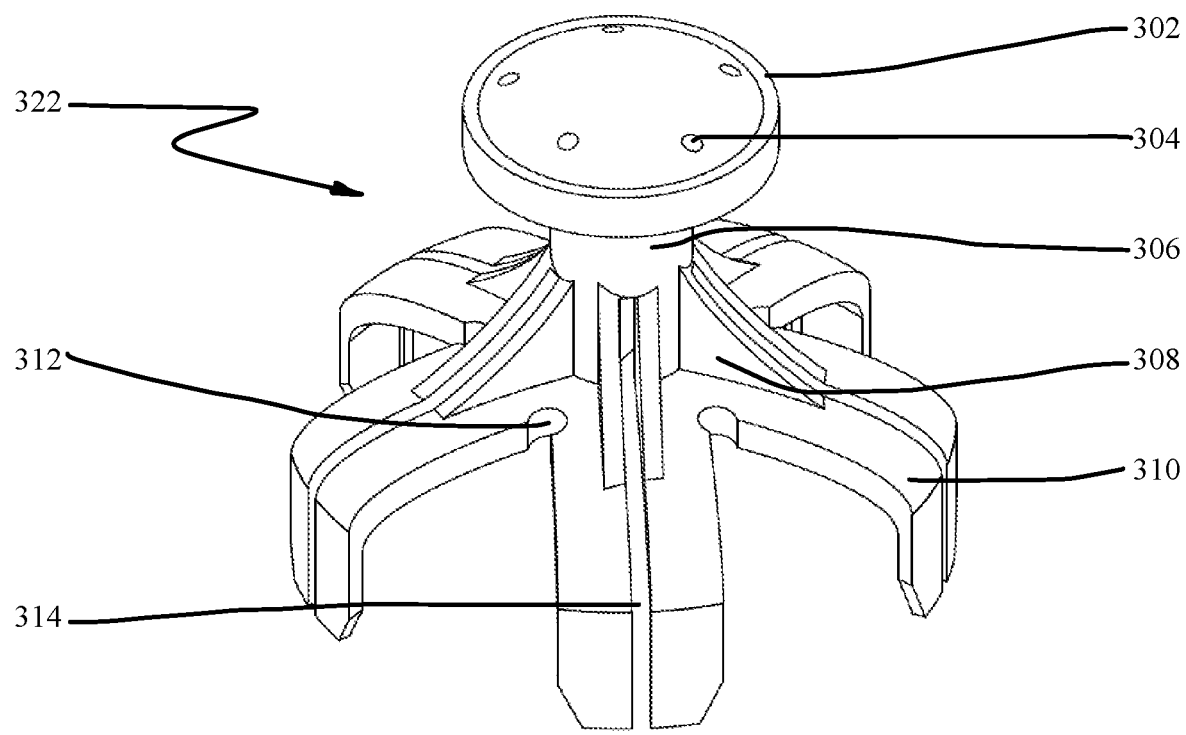
FIG. 23 shows a top perspective view of a version of the present invention for cutting a hamburger into five (5) equal pieces, showing the handle with built-in toothpick storage holes, column, notches, leg extensions and supports, and cutting slots.

FIG. 23 shows another version of the present invention directed to device 322 for quickly, easily, consistently and safely cutting a hamburger into five (5) equal pieces. Shown are several of the features of the invention, including the handle 302 with toothpick storage holes 304, column 306 connecting the handle 302 to the leg extension(s) 310, and leg extension support(s) 308, with cutting slots 314, and notches 312, used to guide placement of toothpicks prior to cutting. The handle is preferably of circular shape to allow easy one-handed control of the device for cutting a hamburger; the column attaching the handle to the leg extension and supports is preferably cylindrical in nature; the leg extensions have a curved orientation to match the shape of a hamburger.

Figure 24:
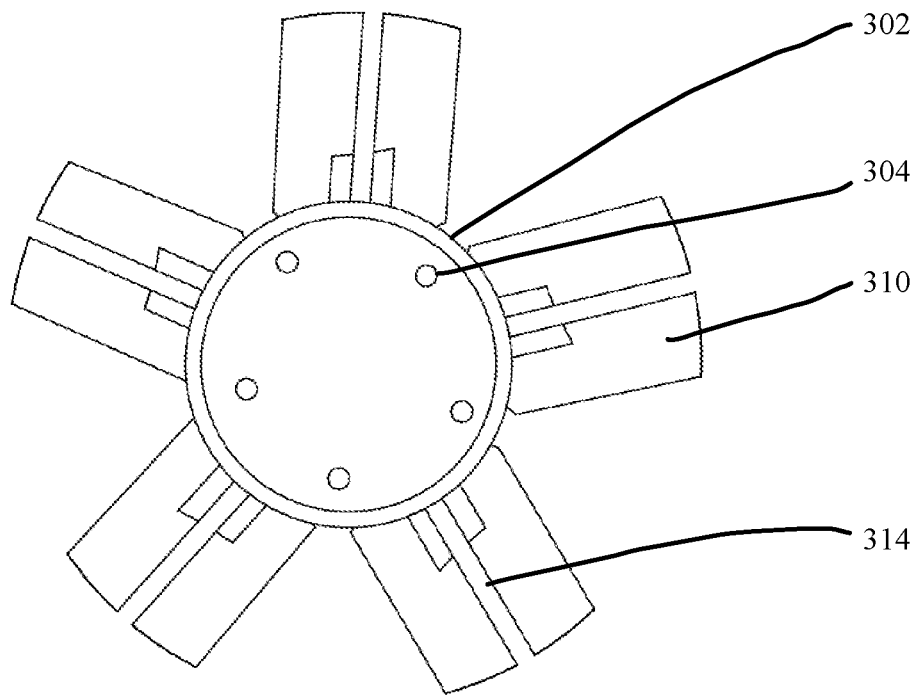
FIG. 24 shows a top view of this version of the present invention showing the handle with built-in toothpick storage holes, leg extensions and cutting slots.

FIG. 24 is a top view of device 322 showing the handle 302 with toothpick storage holes 304, leg extension(s) 310 containing the cutting slots 314 used to guide cutting with a knife 124 (not shown).

Figure 25:
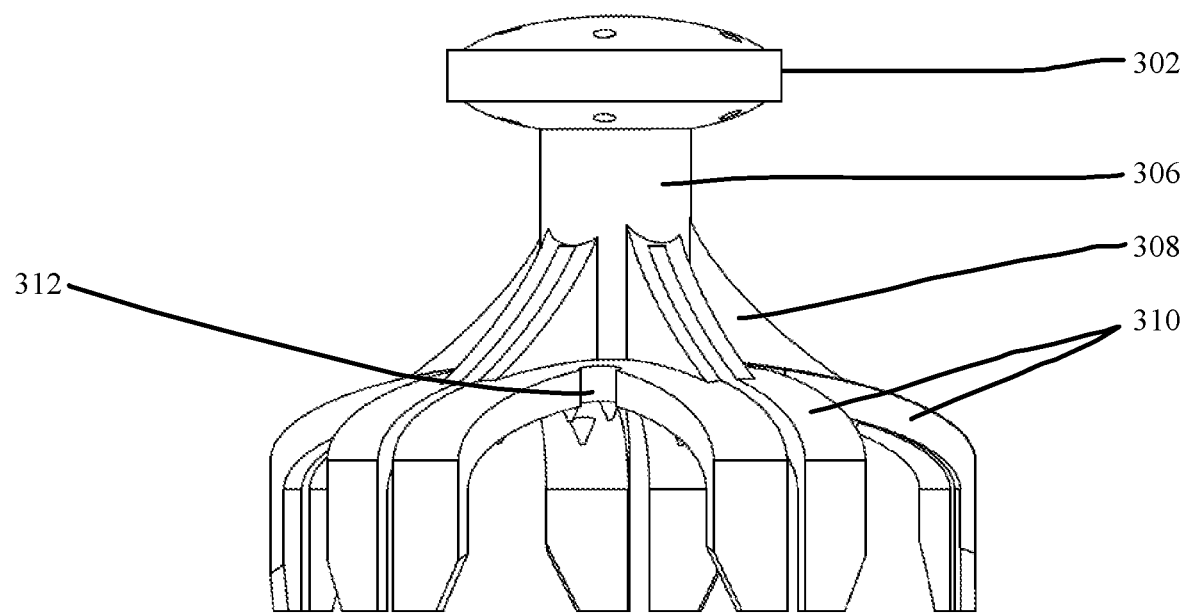
FIG. 25 shows a side view of this version of the present invention showing the handle, column, leg extensions and supports, and cutting slots.

FIG. 25 is a side view of device 322 showing the handle 302, the column 306, leg extension supports 308, leg extensions 310, and cutting notches 312.

Figure 26:
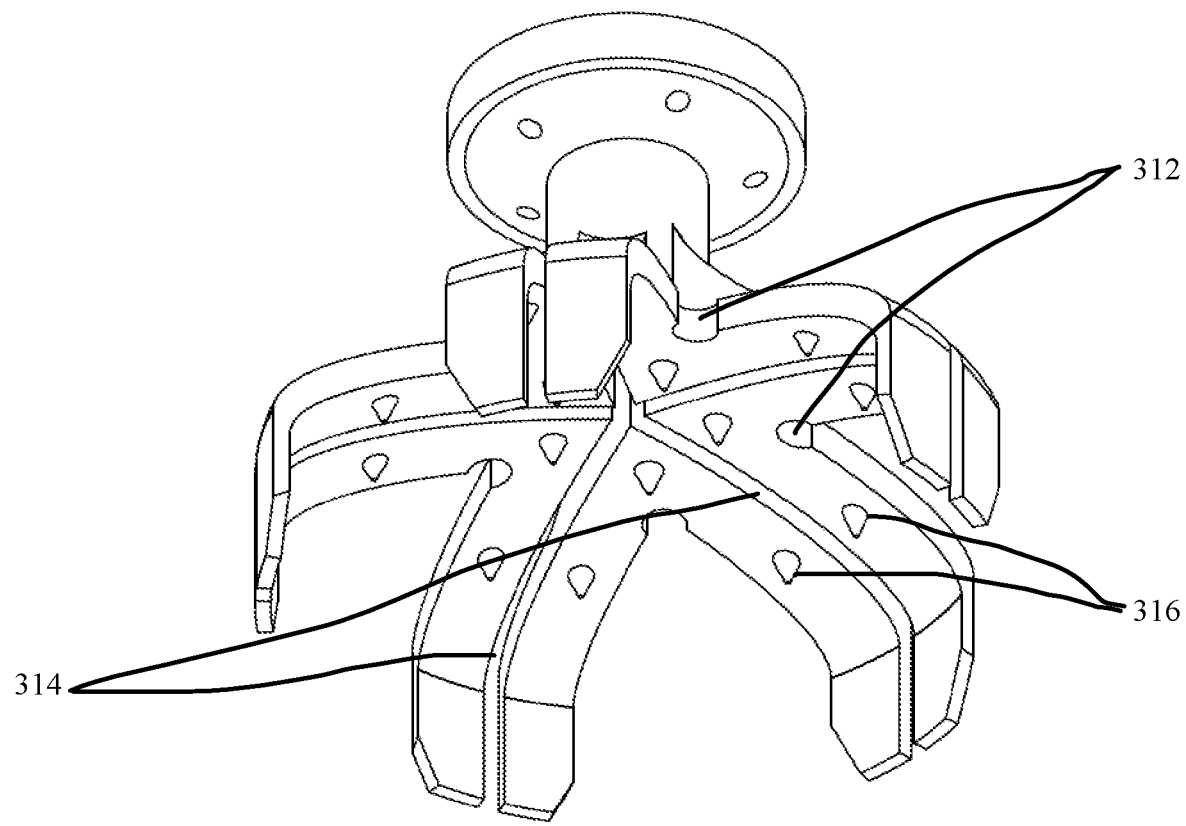
FIG. 26 shows a bottom perspective view of this version of the present invention showing the cutting slots, notches and hamburger picks.

As shown in FIG. 26, the device 322 is equipped with a plurality of hamburger picks 316, under the various leg extensions 310, comprising this version of the present invention. The hamburger picks 316 function to secure the hamburger in place during the cutting operation using the cutting slots 314 in the leg extension and support structure. Also shown are the notches 312, used to guide the placement of toothpicks into the hamburger prior to cutting to maintain the cut pieces after device 322 is removed from the hamburger.

Figure 27:
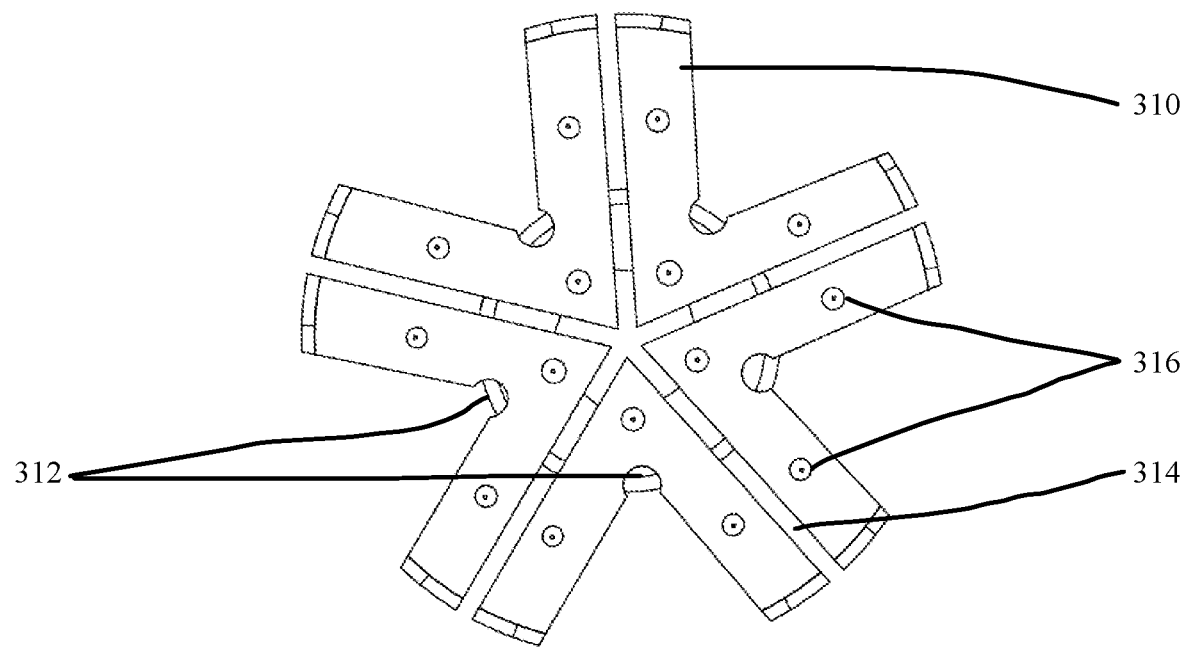
FIG. 27 shows a bottom view of this version of the present invention showing the leg extensions, notches, cutting slots and hamburger picks.

FIG. 27 shows the bottom of device 322 showing the location of the notches 312, cutting slots 314, hamburger picks 316, and leg extensions 310.

Figure 28:
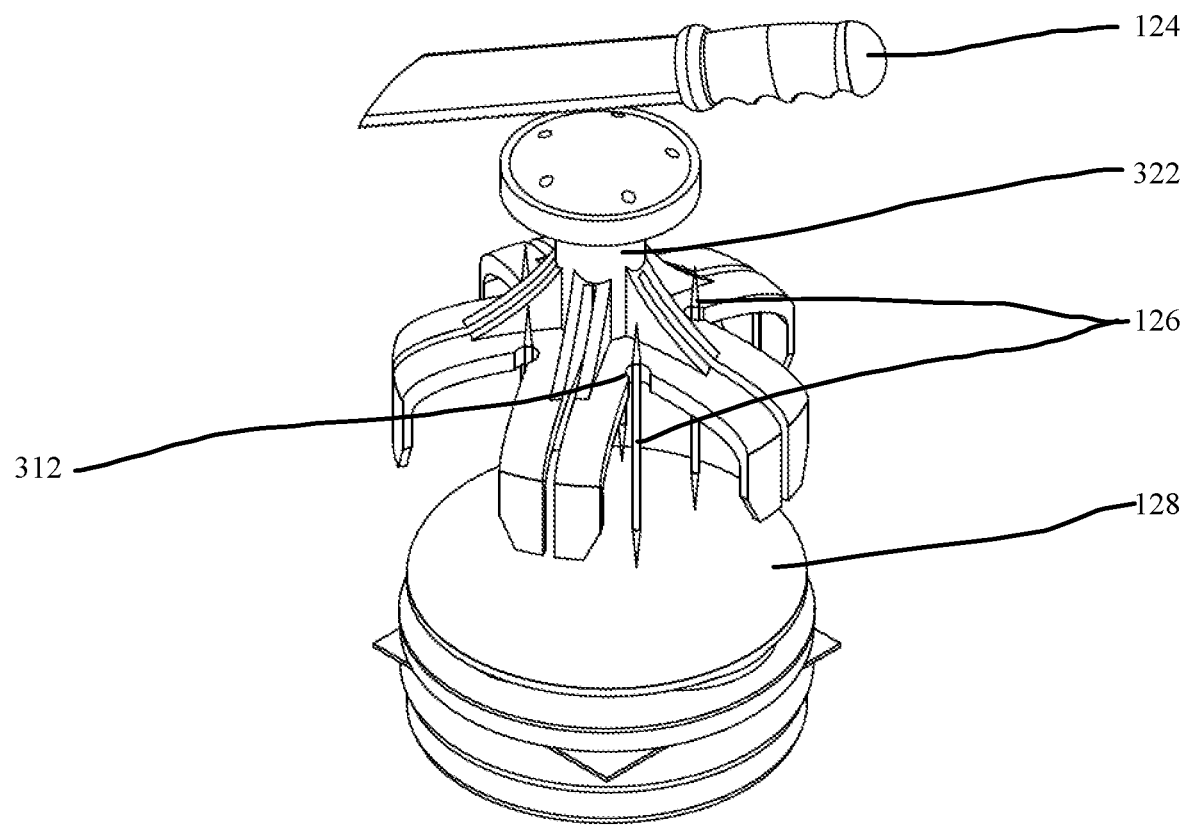
FIG. 28 shows an exploded view of this version of the present invention in preparation for cutting a hamburger into five (5) equal pieces.

As shown in FIG. 28, the device 322 is placed over a hamburger 128 with toothpicks 126 positioned using the notches 312 prior to inserting into the hamburger in preparation for cutting with a knife 124.

Figure 29:
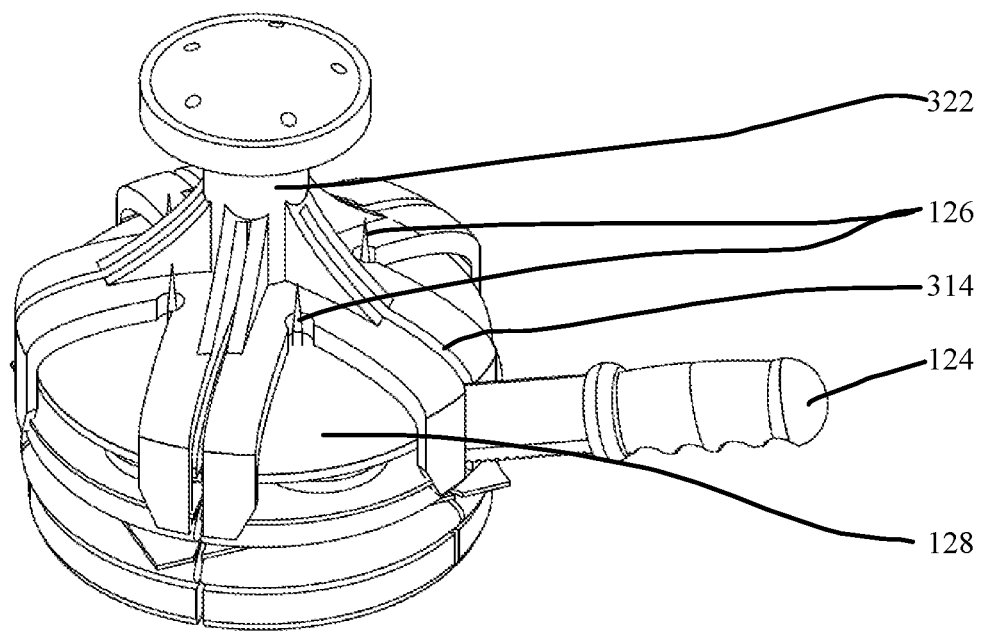
FIG. 29 shows this version of the present invention placed over a hamburger with toothpicks inserted using guide notches and cut into five (5) equal pieces using the cutting slots lined up with the cutting guide mark in the handle.
Figure 30:
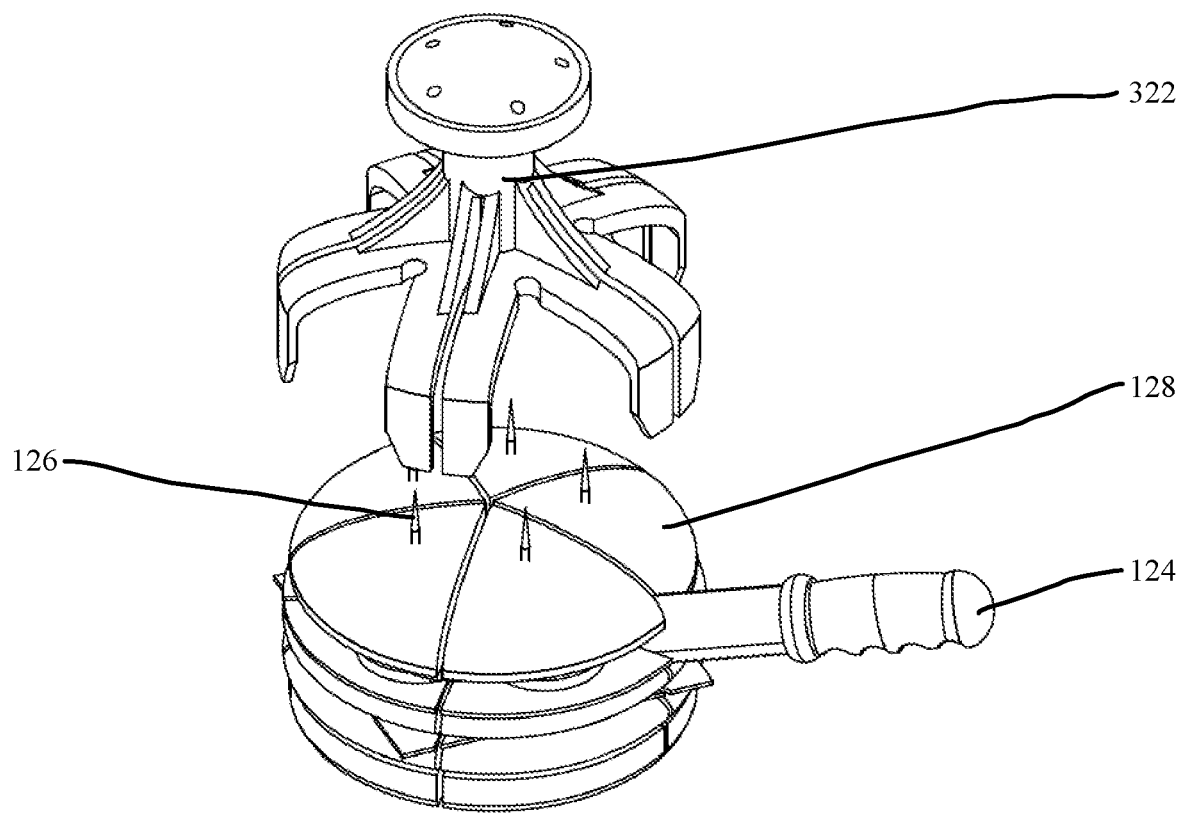
FIG. 30 shows the finished cut hamburger with this version of the present invention removed with the individual cut pieces held together by the previously inserted toothpicks.
Figure 31:
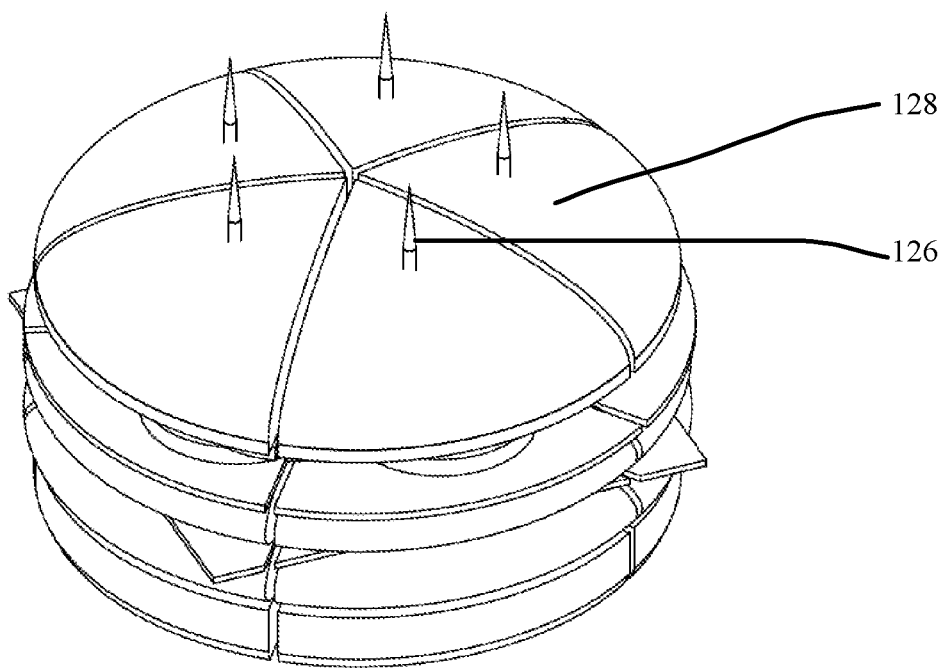
FIG. 31 shows the finished hamburger cut into five (5) equal pieces, each held in place by the previously inserted toothpicks.

FIG. 29 shows the device 322 placed on a hamburger with toothpicks 126 inserted into the hamburger and being cut using the cutting slots 314 of the device to create five (5) equal pieces of hamburger as further depicted in FIG. 30 and FIG. 31.

FIG. 30 shows the device 322 being removed from the cut hamburger 128 with the previously inserted toothpicks 126 used to hold the individual cut pieces together, with the knife 124 in a finished cut of the hamburger.

FIG. 31 shows the finished hamburger 128 cut into five (5) equal size pieces held together using the previously inserted toothpicks 126.

Figure 32:
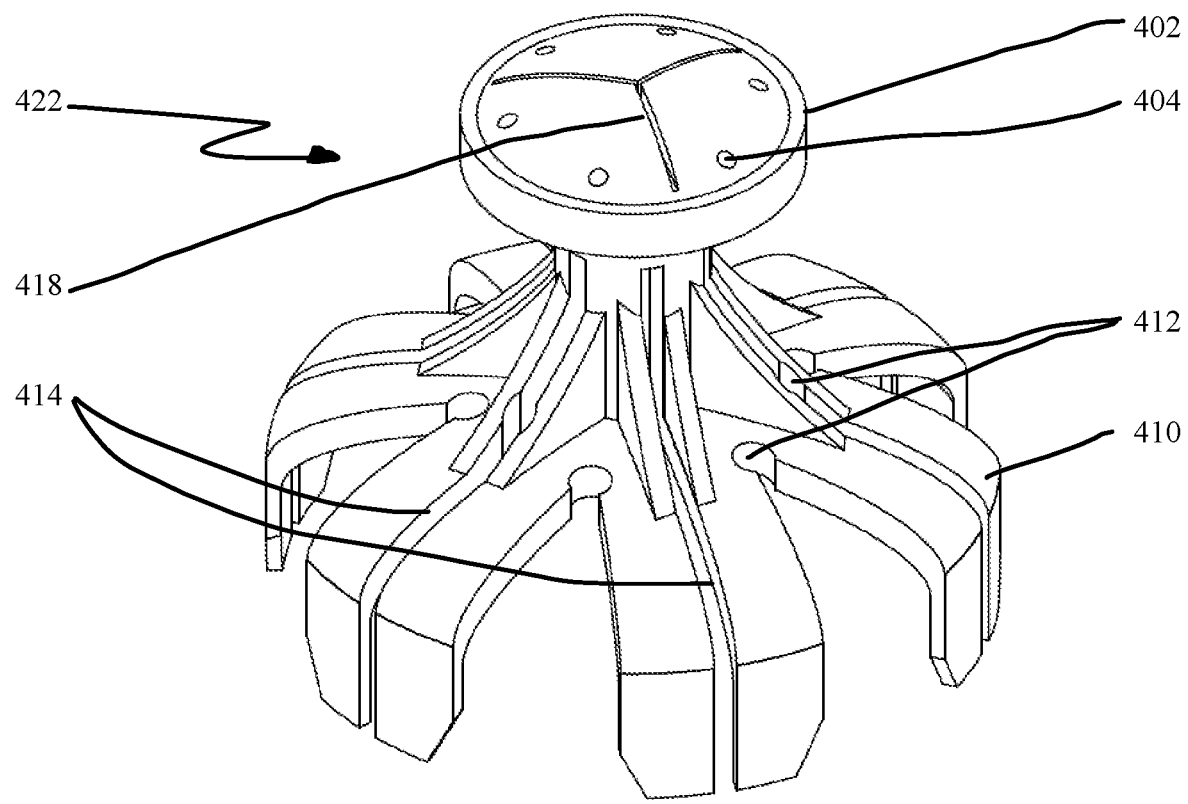
FIG. 32 shows a top perspective view of a version of the present invention for cutting a hamburger into wither two (2), three (3) or six (6) equal pieces, showing the handle within built-in toothpick storage holes and cutting guide mark, notches, leg extensions and cutting slots.

FIG. 32 shows the preferred embodiment of the present invention directed to device 422 for quickly, easily, consistently and safely cutting a hamburger into either two (2), three (3) or six (6) equal pieces depending on the consumers preference. Shown are several of the features of the invention, including the handle 402 with storage holes 404 for storing toothpicks, column 406 connecting the handle 402 to the leg extension(s) 410, and leg extension support(s) 408, with cutting slots 414, and notches 412, used to guide placement of toothpicks prior to cutting. The handle is preferably of circular shape to allow easy one-handed control of the device for cutting a hamburger; the column attaching the handle to the leg extension and supports is preferably cylindrical in nature; the leg extensions have a curved orientation to match the shape of a hamburger. In this version of the invention the handle 402 includes a cutting guide mark 418 to guide the consumer to use the cutting slots that align with the guide when selecting to cut a hamburger into three (3) equal pieces.

Figure 33:
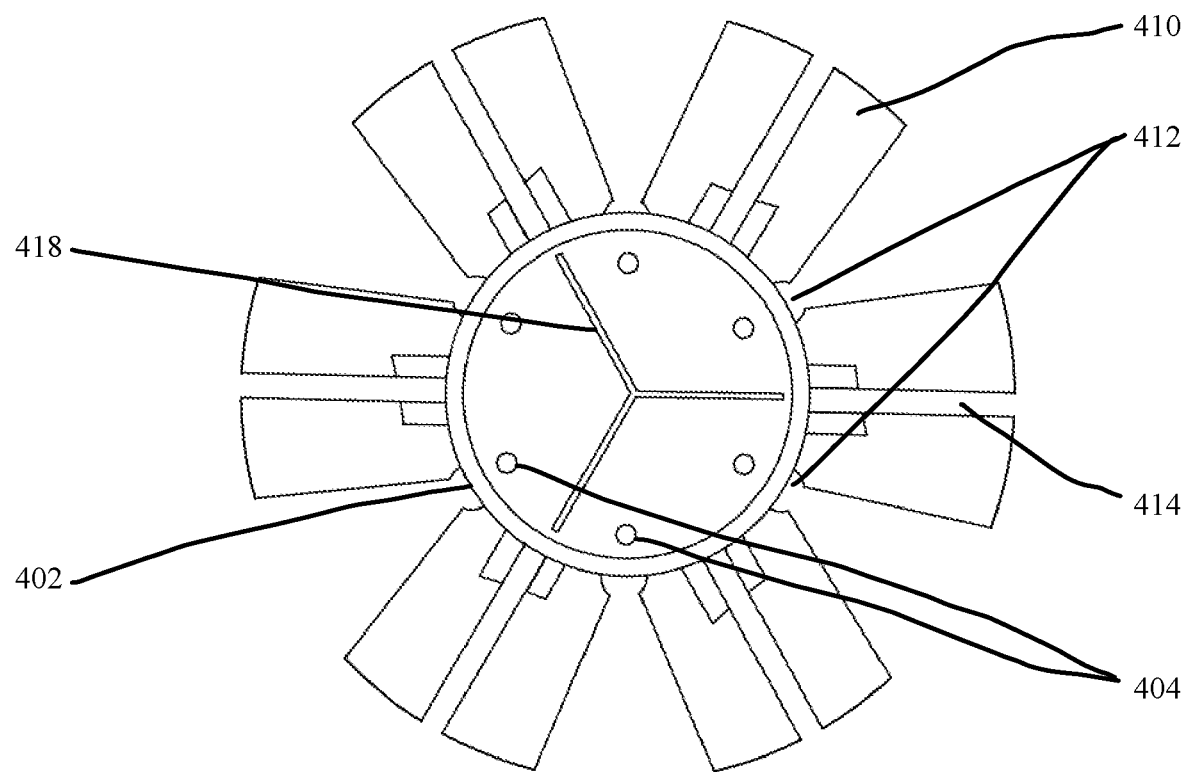
FIG. 33 shows a top view of this version of the present invention showing the handle within built-in toothpick storage holes and cutting guide mark, leg extensions, notches and cutting slots.

FIG. 33 shows a top view of device 422 showing the handle 402 cutting guide mark 418, toothpick storage holes 404, leg extensions 410, notches 412, and cutting slots 414.

Figure 34:
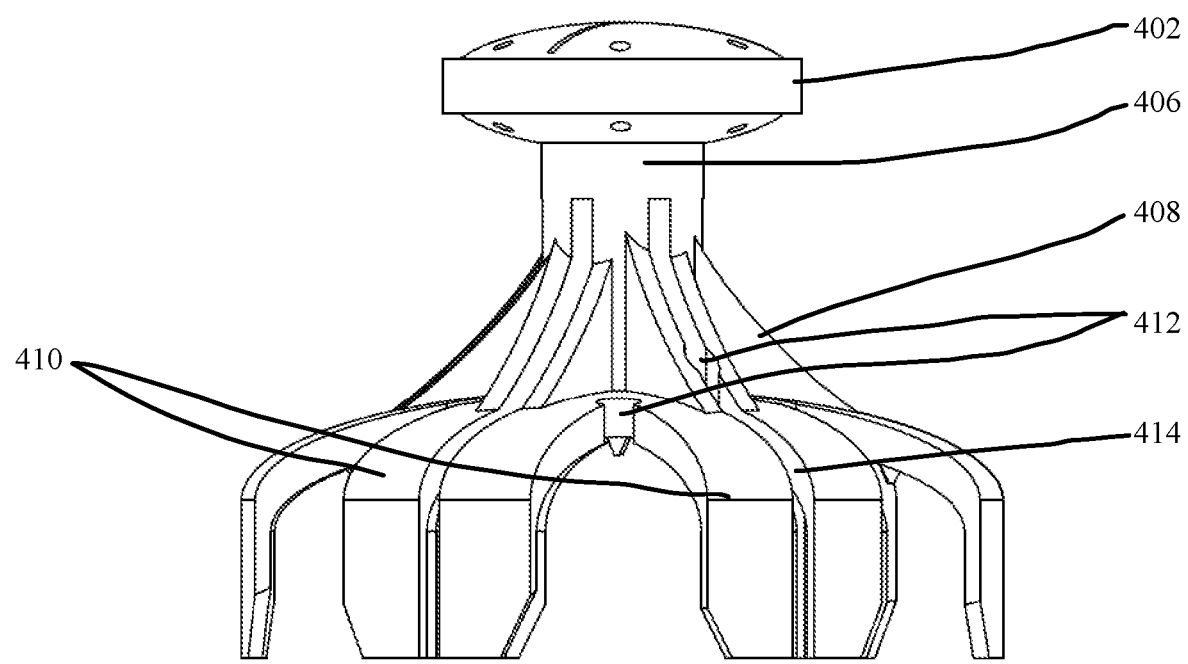
FIG. 34 shows a side view of this version of the present invention showing the handle, column, leg extensions and supports, notches and cutting slots.

FIG. 34 is a side view of device 422 showing the handle 402, column 406, leg extension supports 408, leg extensions 410, notches 412, and cutting slots 414.

Figure 35:
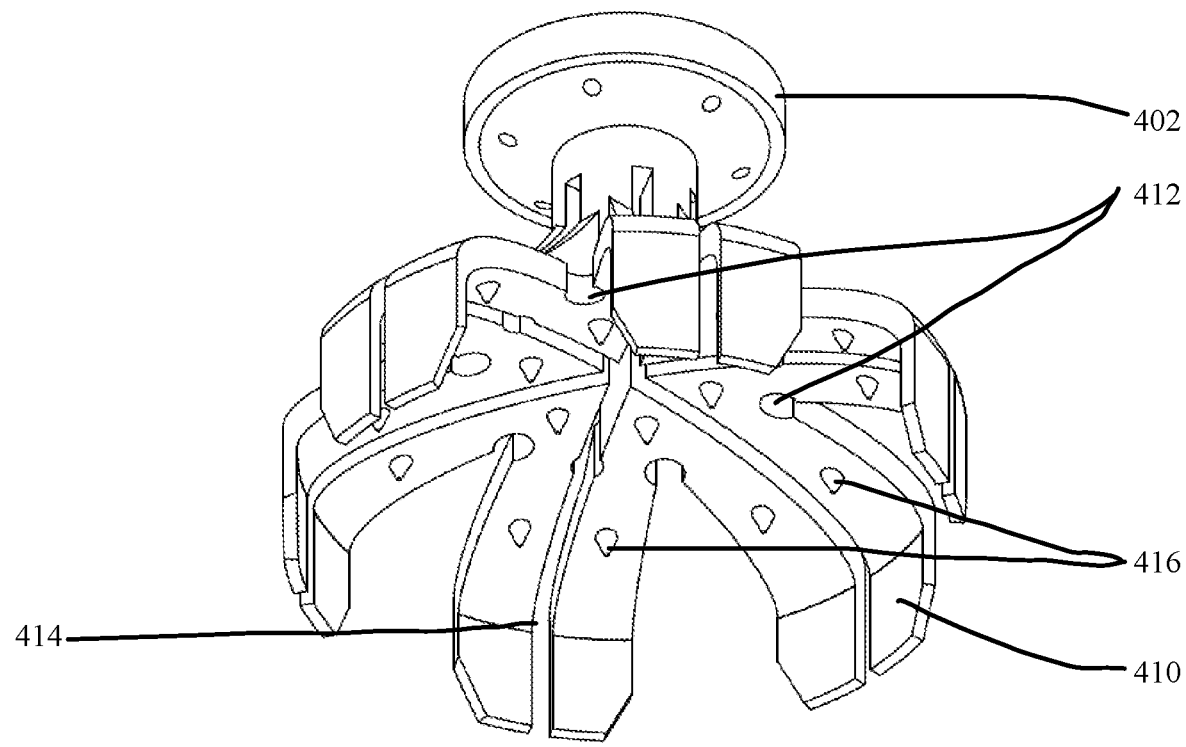
FIG. 35 shows a bottom perspective view of this version of the present invention showing the handle, leg extensions, notches, cutting slots and hamburger picks.

FIG. 35 is a bottom perspective view of device 422 showing the plurality of hamburger picks 416, under the various leg extensions 410, comprising this version of the present invention. The hamburger picks 416 function to secure the hamburger in place during the cutting operation using the cutting slots 414. Also shown are the notches 412, used to guide the placement of toothpicks into the hamburger prior to cutting to keep the cut piece of hamburger together after device 422 is removed.

Figure 36:
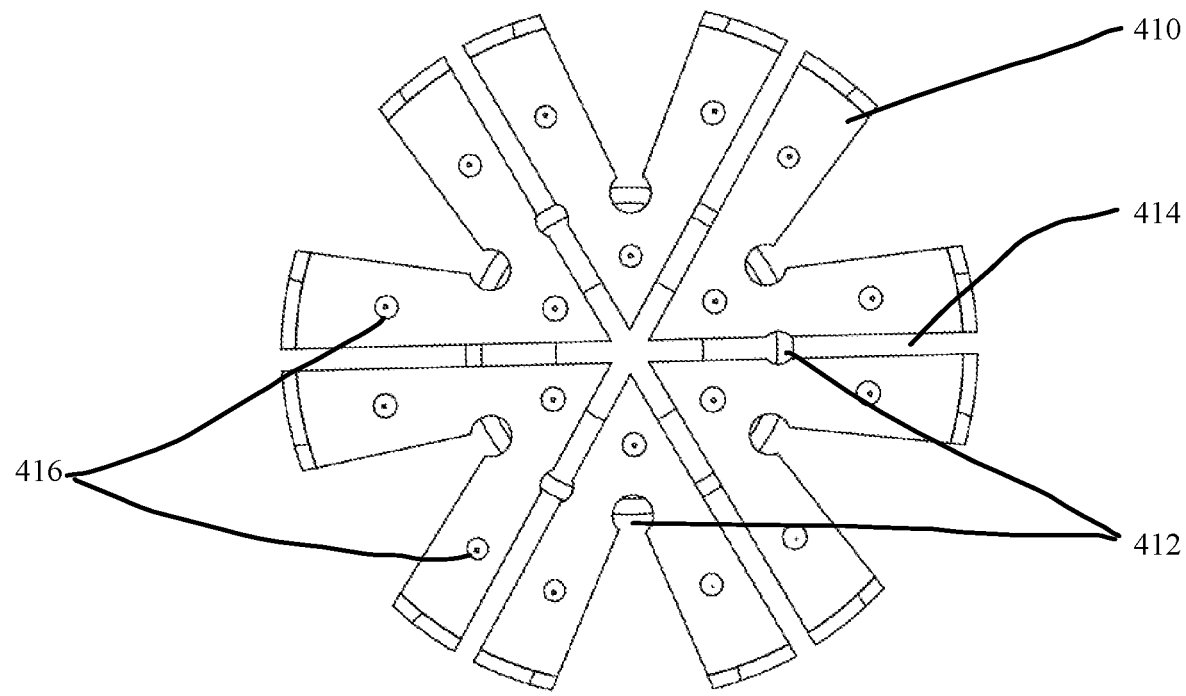
FIG. 36 shows a bottom view of this version of the present invention showing the leg extensions, notches, cutting slots and hamburger picks.

FIG. 36 shows the bottom of device 422 showing the location of the notches 412, cutting slots 414, hamburger picks 416, and leg extension 410.

Figure 37:
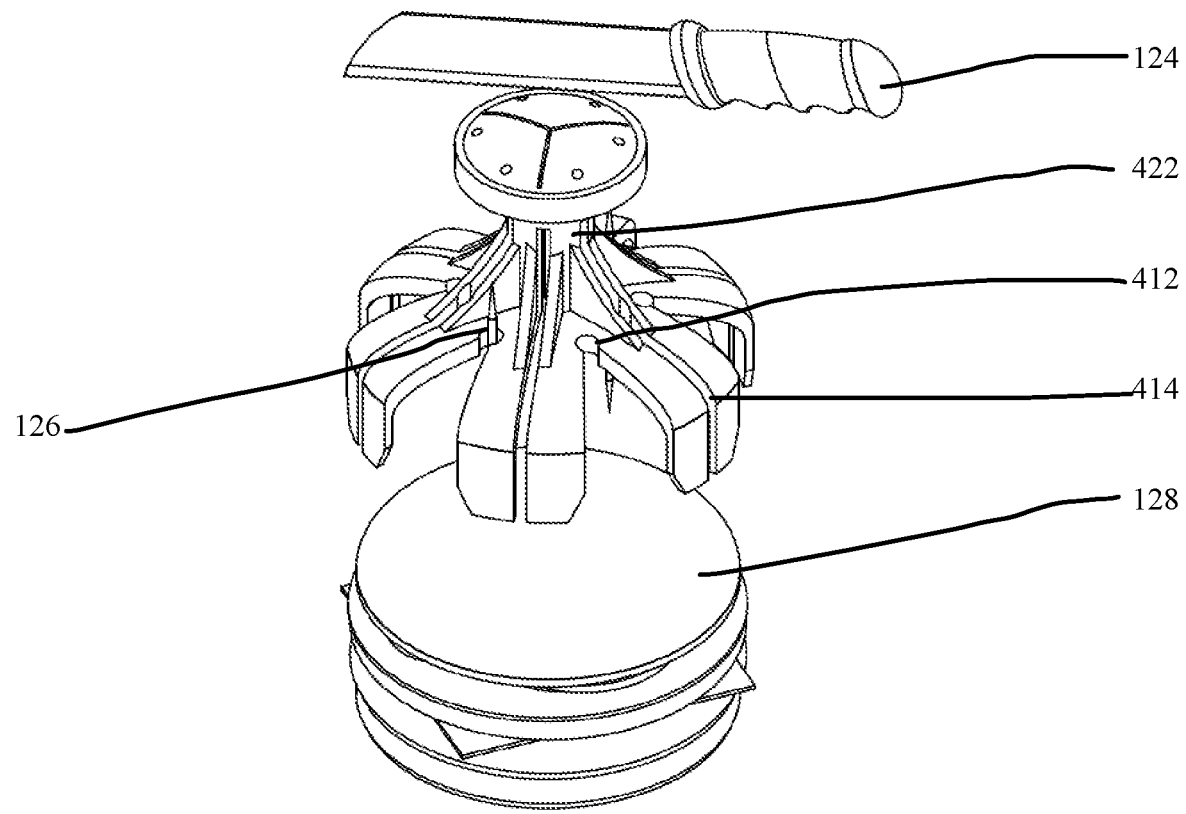
FIG. 37 shows an exploded view of this version of the present invention in preparation for cutting a hamburger into two (2) equal pieces, showing toothpicks, notches, and cutting slots.

FIG. 37 shows the device 422 configured to cut a hamburger into two (2) equal pieces by placing the device over a hamburger 128 and positioning toothpicks 126 using the notches on opposite sides of any two (2) notches, in preparation to cut the hamburger into two (2) equal pieces prior to cutting with a knife 124. When using the device to cut a hamburger into two (2) equal pieces any two (2) notches 412 located directly opposite one another on the device can be used for positioning toothpicks 126 prior to cutting the hamburger. Once positioned, the hamburger 128 is cut by using the cutting slot 414 between the inserted toothpicks 126 to cut the hamburger 128 into two (2) equal pieces.

Figure 38:
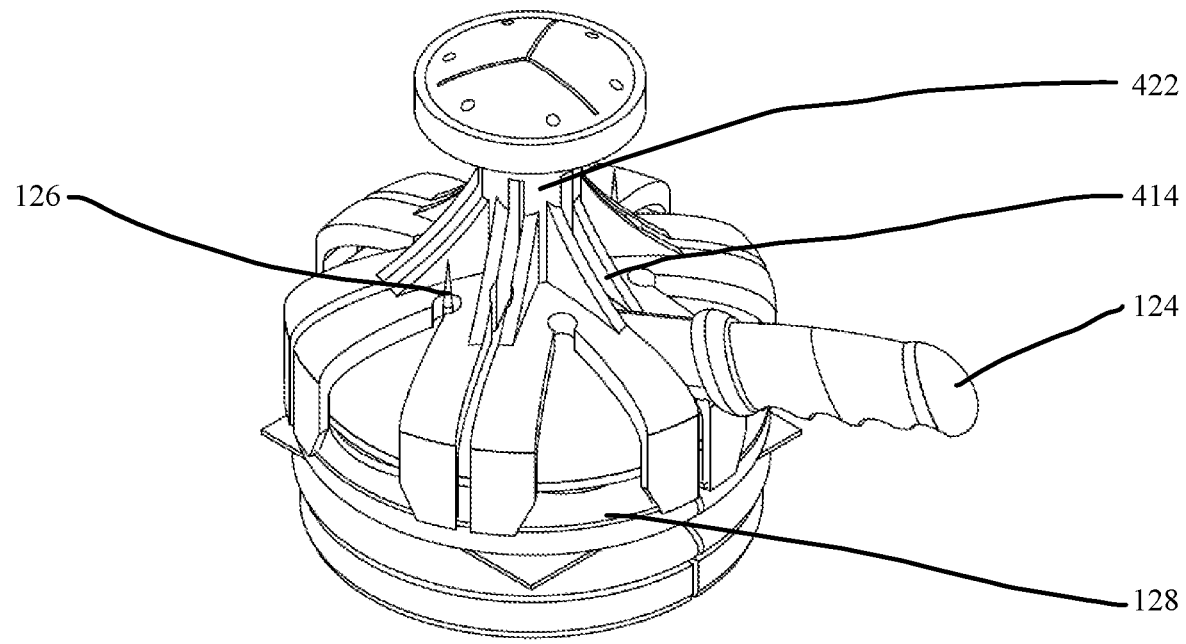
FIG. 38 shows this version of the present invention placed over a hamburger with toothpicks inserted using guide notches and being cut into two (2) equal pieces using the cutting slots.
Figure 39:
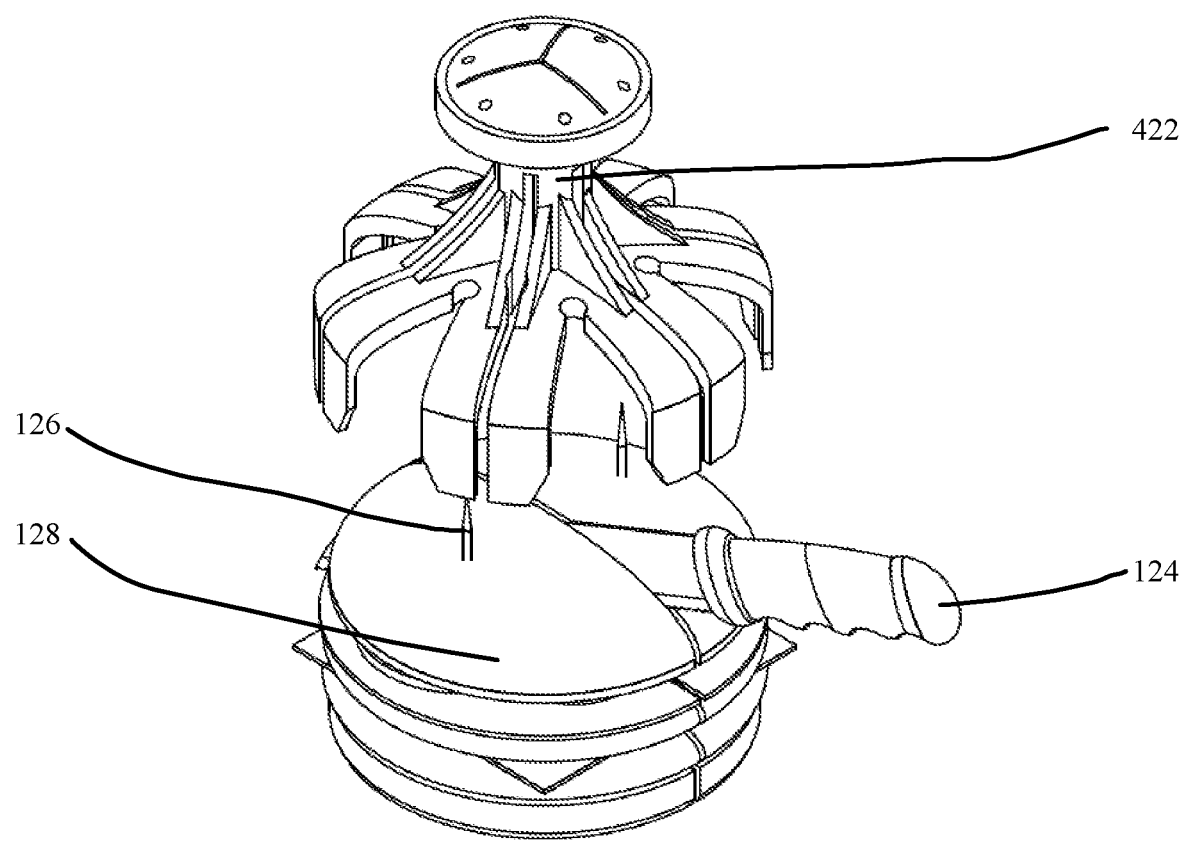
FIG. 39 shows the cut hamburger with a version of the present invention being removed after the hamburger has been cut using a knife.
Figure 40:
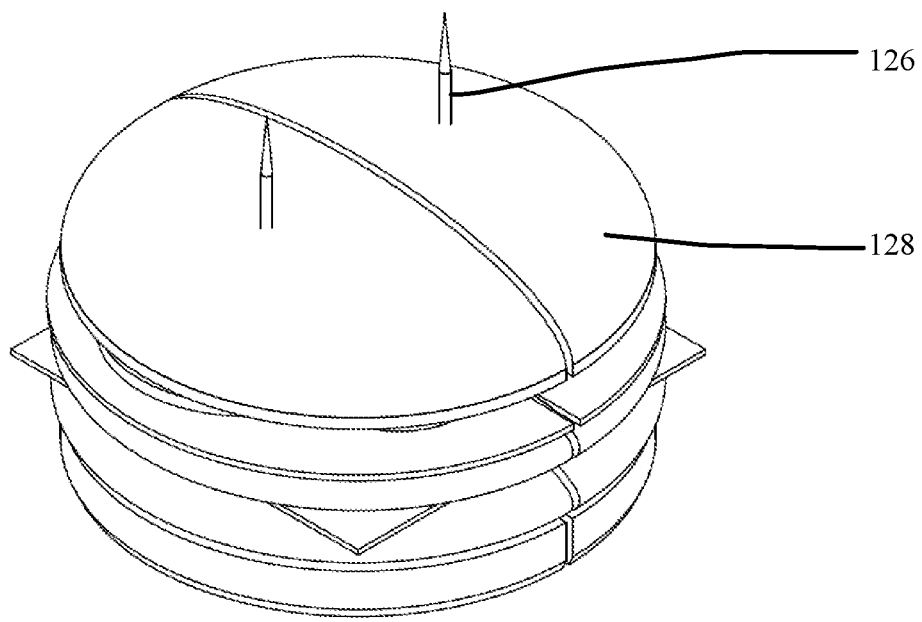
FIG. 40 shows the finished hamburger cut into two (2) equal pieces, each held together by the previously inserted toothpicks.

FIG. 38 shows the device 422 placed on a hamburger with toothpicks 126 inserted into the hamburger as positioned in the previous FIG. 37 and the hamburger being cut using the cutting slots 414 of the device to create two (2) equal pieces of hamburger in this version of the present invention, as further depicted in FIG. 39 and FIG. 40.

FIG. 39 shows the device 422 being removed from the cut hamburger 128 with the previously inserted toothpicks 126 used to hold the individual cut pieces together, with the knife 124 in a finished cut of the hamburger.

FIG. 40 shows the finished hamburger 128 cut into two (2) equal size pieces held together using the previously inserted toothpicks 126.

Figure 41:
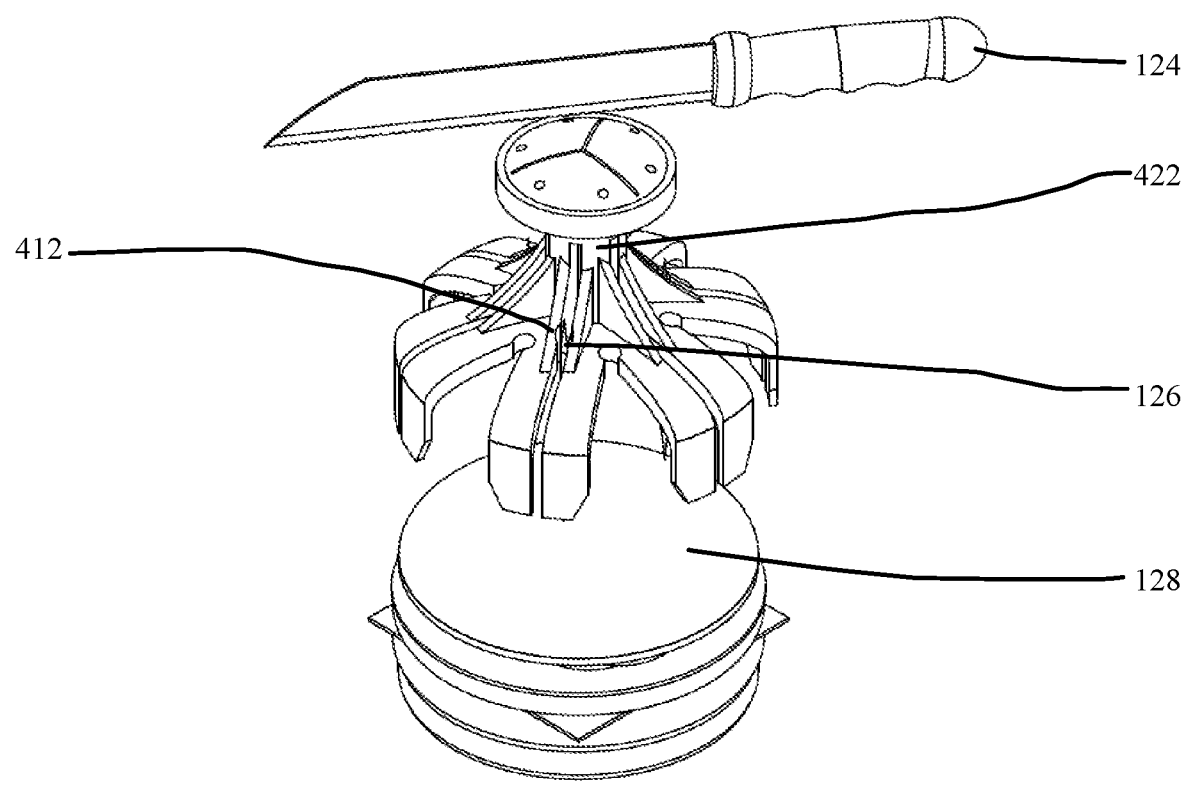
FIG. 41 shows an exploded view of this version of the present invention in preparation for cutting a hamburger into three (3) equal pieces, including toothpicks and notches.

FIG. 41 shows the device 422 configured to cut a hamburger into three (3) equal pieces by placing the device over a hamburger 128 and positioning toothpicks 126 using the three (3) notches 412 located in the cutting slots 414 in preparation to cut the hamburger into three (3) equal pieces with a knife 124.

Figure 42:
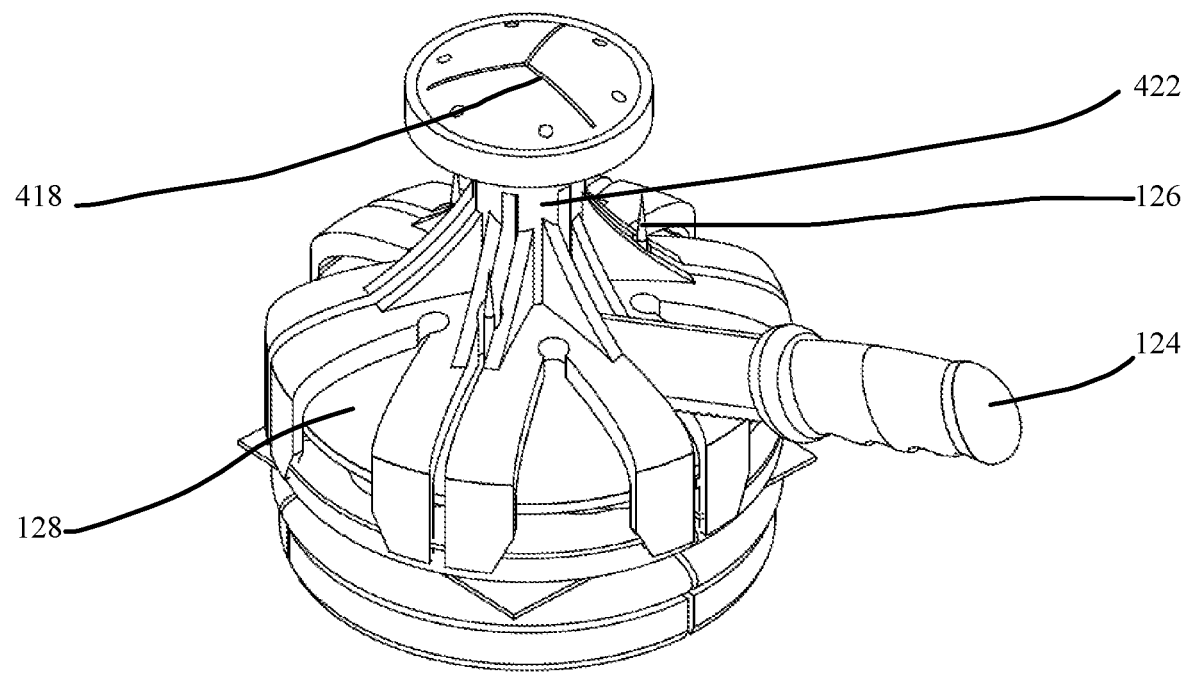
FIG. 42 shows this version of the present invention placed over a hamburger with toothpicks inserted using notches and being cut into three (3) equal pieces using the cutting slots aligned the cutting guide mark in the handle.
Figure 43:
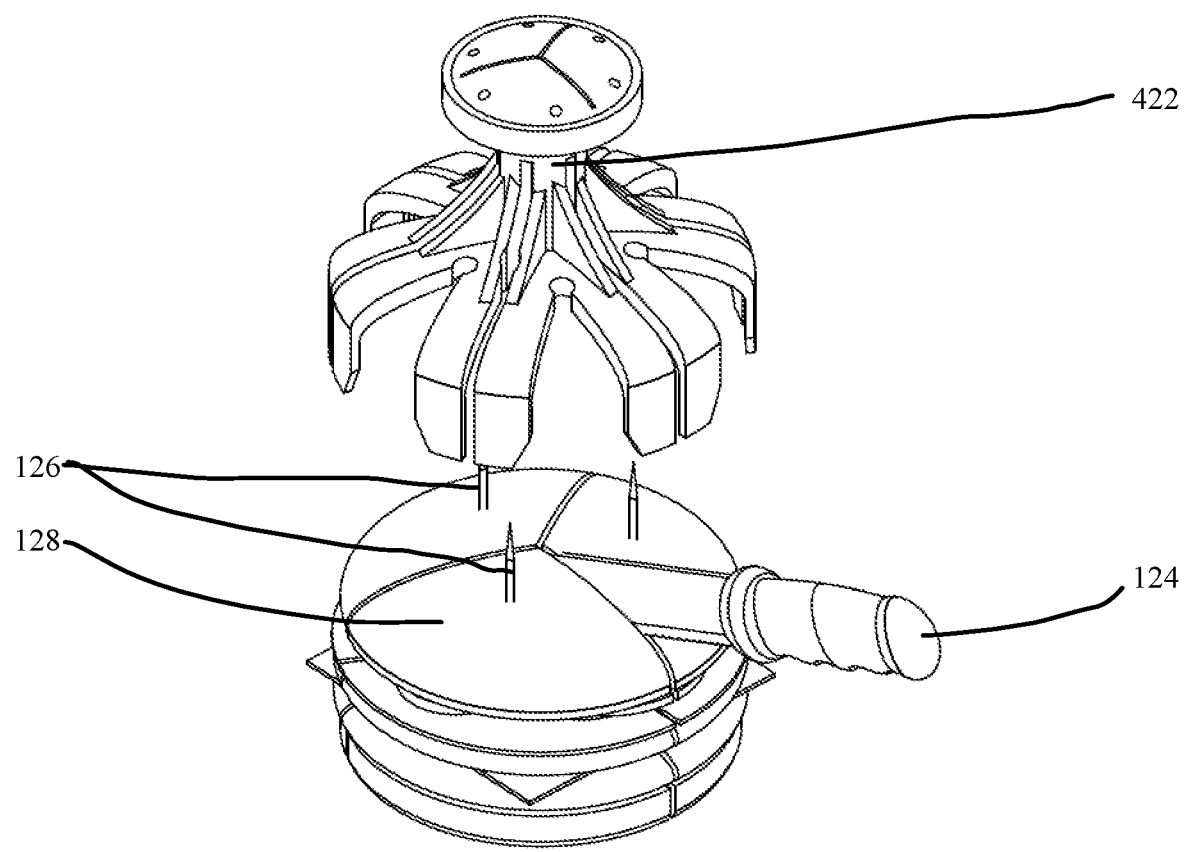
FIG. 43 shows this version of the present invention being removed from the finished hamburger after being cut into three (3) equal pieces, each held together by the previously inserted toothpicks.
Figure 44:
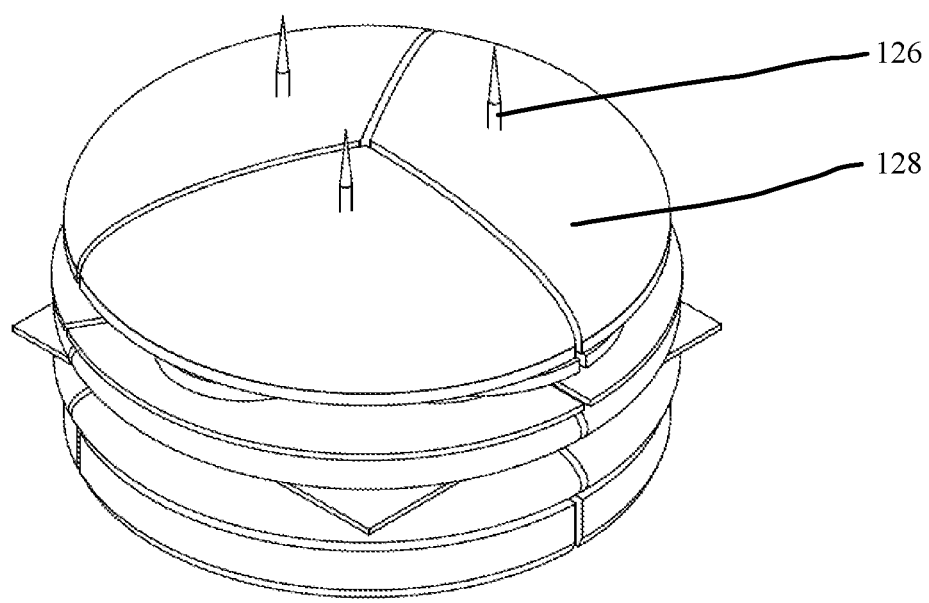
FIG. 44 shows the finished cut hamburger in three (3) equal pieces, each held together by the previously inserted toothpicks.

FIG. 42 shows the device 422 in place on a hamburger 128 with toothpicks 126 inserted into the hamburger as shown in previous FIG. 41 and the hamburger being cut using the cutting slots 414 aligned in the same direction as the cutting guide mark 418 on top of the handle 402, with a knife 124 used to create three (3) equal cut pieces of hamburger in this version of the present invention, as further illustrated in FIG. 43 and FIG. 44.

FIG. 43 shows the device 422 being removed after cutting of the hamburger 128 into three (3) equal pieces, each held together by the previously inserted toothpicks 126 with the knife 124 shown in a cutting position.

FIG. 44 shows the hamburger 128 in three (3) equal pieces with toothpicks 126 in place.

Figure 45:
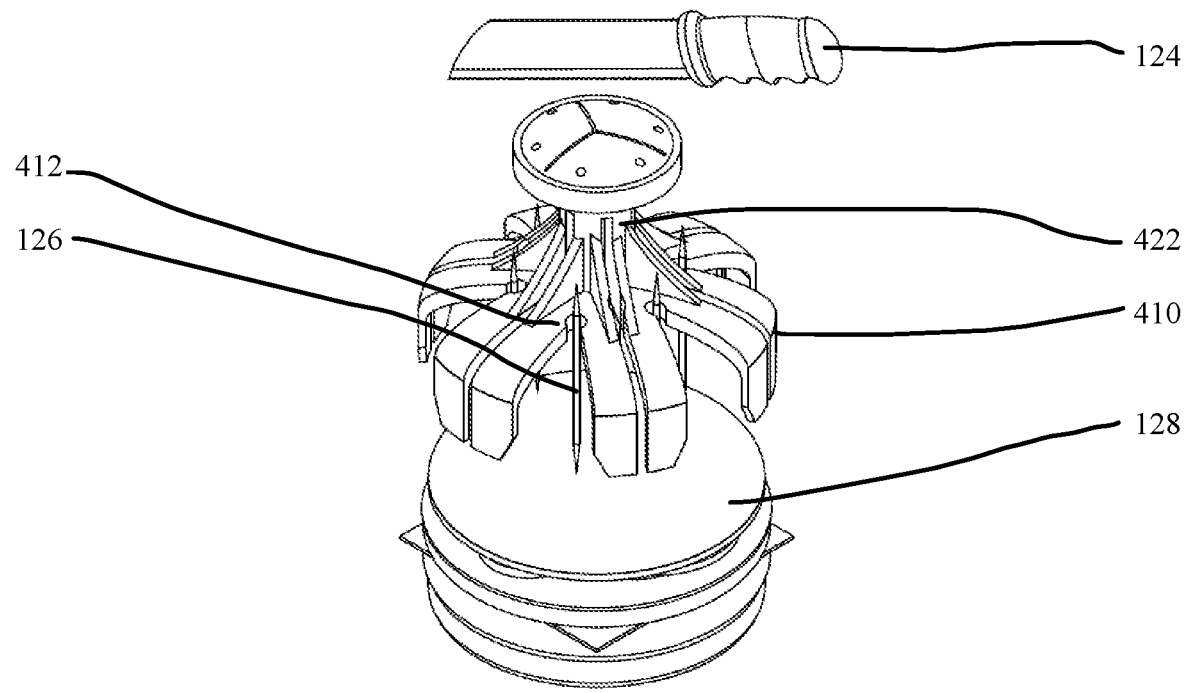
FIG. 45 shows an exploded view of this version of the present invention in preparation for cutting a hamburger into six (6) equal pieces, including toothpicks, notches, leg extensions.

FIG. 45 FIG. 41 shows the device 422 configured to cut a hamburger into six (6) equal pieces by placing the device over a hamburger 128 and positioning toothpicks 126 using the six (6) notches 412 located between the leg extensions 410 in preparation to cut the hamburger into six (6) equal pieces with a knife 124.

Figure 46:
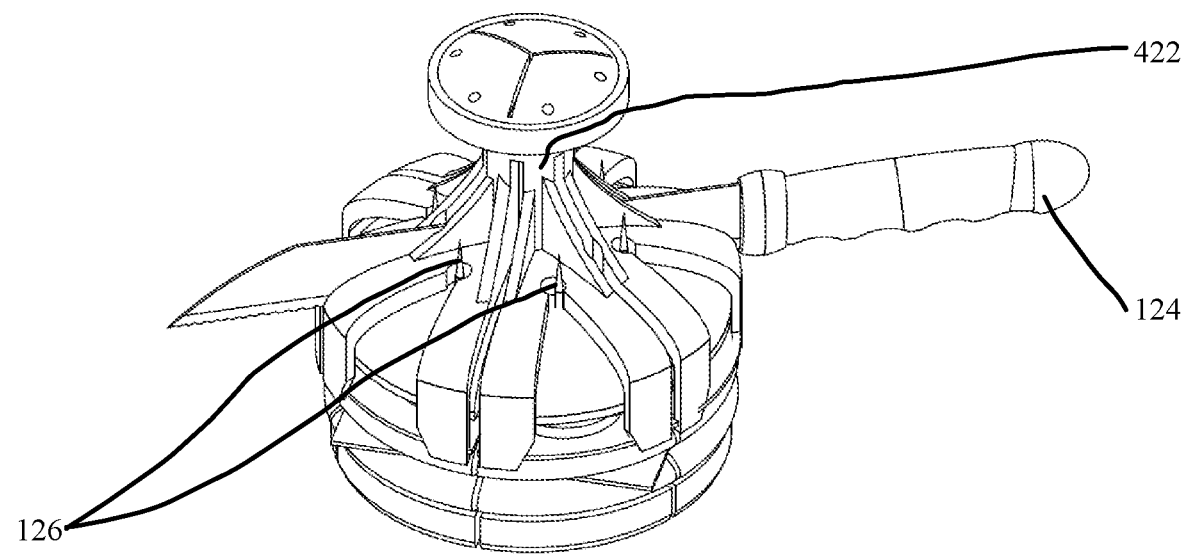
FIG. 46 shows this version of the present invention placed over a hamburger with toothpicks inserted using notches and being cut into six (6) equal pieces.
Figure 47:
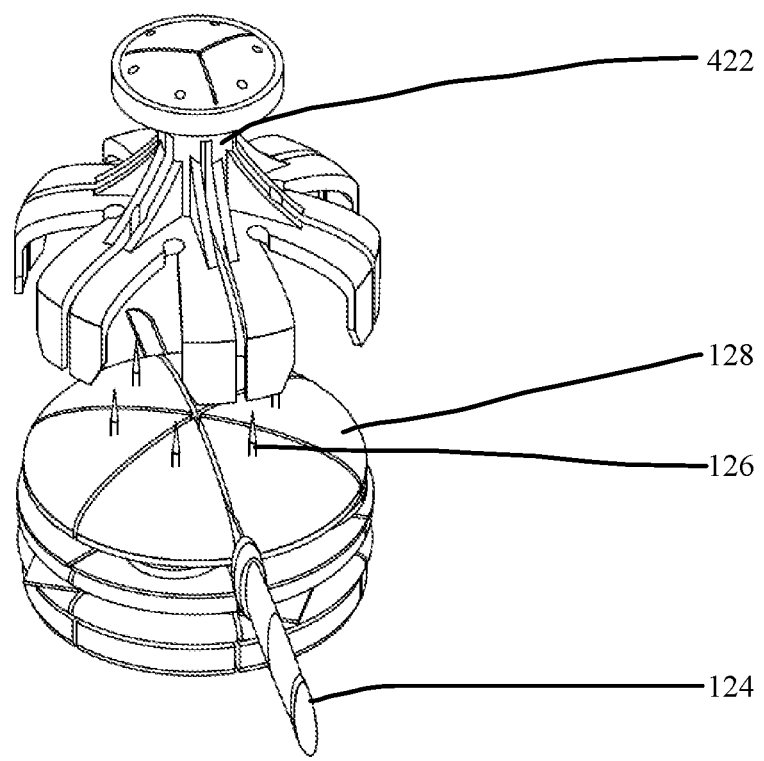
FIG. 47 shows this version of the present invention being removed from the finished hamburger cut into six (6) equal pieces, each piece held together by the previously inserted toothpicks.
Figure 48:
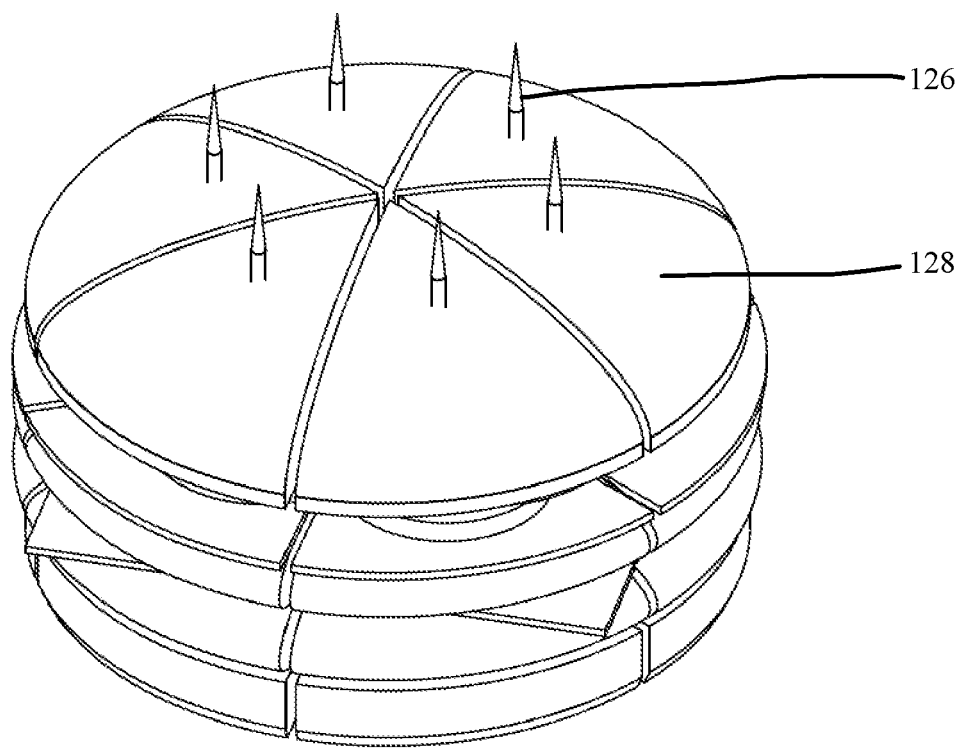
FIG. 48 shows the finished hamburger cut into six (6) equal pieces, each held in place by the previously inserted toothpicks.

FIG. 46 shows the device 422 in place on a hamburger 128 with toothpicks 126 inserted into the hamburger as shown in previous FIG. 45 and the hamburger being cut using the cutting slots 414 with a knife 124 used to create six (6) equal cut pieces of hamburger in this version of the present invention, as further illustrated in FIG. 47 and FIG. 48.

FIG. 47 shows the device 422 being removed after cutting of the hamburger 128 into six (6) equal pieces, each held together by the previously inserted toothpicks 126 with the knife 124 shown in a cutting position.

FIG. 48 shows the hamburger 128 cut into six (6) equal pieces with toothpicks 126 in place.

The present invention is designed to be light weight, compact and portable so the consumer can use it when dining out or at home, depending upon their needs. The present invention can be manufactured from a variety of different materials, including but not limited to plastic, by a variety of existing processes, such as injection molding as an example. The present invention offers the advantage of portability and compactness that is absent in the art for similar devices directed to this food product.

The invention claimed is:

1. A hamburger holder and cutting guide for holding a hamburger and cutting it into a plurality of pieces for eating by a consumer, said hamburger holder and cutting guide comprising:
   a thick-centered circular disk handle;
   an elongated circular support column attached to said thick-centered circular disk handle;
   a plurality of curved leg extensions having an end attached to an end of said elongated circular support column, and opposite end of said curved leg extensions terminating in a straight, flat end at an angle between 90 and 135 degrees from the curved leg extension;
   a plurality of right triangular supports attached to said curved leg extensions and said elongated circular support column;
   a plurality of semi-circular notches.

2. The hamburger holder and cutting guide of claim 1, wherein the thick-centered circular disk handle includes a plurality of circular holes.

3. The hamburger holder and cutting guide of claim 1, wherein the thick-centered circular disk handle is a circular disk shape.

4. The hamburger holder and cutting guide of claim 1, wherein the elongated circular support column is cylindrical.

5. The hamburger holder and cutting guide of claim 1, wherein the right triangular support has a triangular shape.

6. The hamburger holder and cutting guide of claim 1, wherein a plurality of semi-circular notches is placed between each pair of curved shaped leg extensions where they connect to the elongated circular support column, and a notch is placed in the cutting slot.

7. The hamburger holder and cutting guide of claim 1, wherein the curved leg extension connected to the elongated circular support column and triangular support contains a cutting slot.

8. The hamburger holder and cutting guide of claim 1, wherein the interior surface of the curved leg extension contains a plurality of conically shaped projections.

9. A method for using the hamburger holder and cutting guide of claim 1 to cut a hamburger into a plurality of equal size pieces suitable for easy handling and eating comprising the following steps:
   preparing or purchasing a hamburger;
   placing said hamburger on a cutting surface;

placing the hamburger holder and cutting guide on top of said hamburger;

inserting toothpicks into said hamburger using the notches on said hamburger holder and cutting guide;

using a knife to cut said hamburger into a plurality of pieces using the cutting slots of said hamburger holder and cutting guide depending on the embodiment of said hamburger holder and cutting guide selected;

removing said hamburger holder and cutting guide from the freshly cut said hamburger and serving the subdivided pieces of said hamburger held together by the toothpicks to the consumer.

10. The method of claim 9 wherein the hamburger holder and cutting guide is placed on the hamburger for cutting said hamburger into three equal size pieces by using all cutting slots of the hamburger holder and cutting guide.

11. The method of claim 9 wherein the hamburger holder and cutting guide is placed on the hamburger for cutting into either two or four equal size pieces and is used to cut said hamburger into two pieces by using cutting slots aligned with cutting guide mark on the hamburger holder and cutting guide.

12. The method of claim 9 wherein the hamburger holder and cutting guide is placed on the hamburger for cutting into either two or four equal size pieces and is used to cut said hamburger into four pieces using all cutting slots of the hamburger holder and cutting guide.

13. The method of claim 10 wherein the hamburger holder and cutting guide is placed on the hamburger for cutting into five equal size pieces using all cutting slots of the hamburger holder and cutting guide.

14. The method of claim 9 wherein the hamburger holder and cutting guide is placed on the hamburger for cutting into either two, three or six equal size pieces and is used to cut said hamburger into two equal size pieces using any pair of directly opposite slots of the hamburger holder and cutting guide.

15. The method of claim 9 wherein the hamburger holder and cutting guide is placed on the hamburger for cutting into either two, three or six equal size pieces and is used to cut said hamburger into three (3) equal size pieces using cutting slots aligned with cutting guide mark on the hamburger holder and cutting guide.

16. The method of claim 9 wherein the hamburger holder and cutting guide is placed on the hamburger for cutting into either two, three or six equal size pieces and is used to cut said hamburger into six equal size pieces using all cutting slots of the hamburger holder and cutting guide.

* * * * *